(12) United States Patent
Pruitt et al.

(10) Patent No.: US 12,247,681 B1
(45) Date of Patent: Mar. 11, 2025

(54) ADAPTER ASSEMBLY

(71) Applicant: PRUITT TOOL & SUPPLY CO., Fort Smith, AR (US)

(72) Inventors: Grant Pruitt, Fort Smith, AR (US); Cris Braun, Van Buren, AR (US)

(73) Assignee: PRUITT TOOL & SUPPLY CO., Fort Smith, AR (US)

( * ) Notice: Subject to any disclaimer, the term of this patent is extended or adjusted under 35 U.S.C. 154(b) by 289 days.

(21) Appl. No.: 17/736,739

(22) Filed: May 4, 2022

Related U.S. Application Data

(63) Continuation of application No. 16/531,986, filed on Aug. 5, 2019, now abandoned, which is a continuation of application No. 14/919,424, filed on Oct. 21, 2015, now Pat. No. 10,371,294, which is a continuation-in-part of application No. 13/199,198, filed on Aug. 22, 2011, now Pat. No. 9,243,730, which is a continuation-in-part of application No. 29/372,040, filed on Oct. 7, 2010, now Pat. No. Des. 647,539.

(60) Provisional application No. 61/404,152, filed on Sep. 28, 2010.

(51) Int. Cl.
*F16L 21/06* (2006.01)
*E21B 33/08* (2006.01)
*F16L 25/08* (2006.01)

(52) U.S. Cl.
CPC .......... *F16L 21/065* (2013.01); *E21B 33/085* (2013.01); *F16L 25/08* (2013.01)

(58) Field of Classification Search
CPC ......... F16L 21/05; F16L 21/065; F16L 25/08; E21B 33/085
See application file for complete search history.

(56) References Cited

U.S. PATENT DOCUMENTS

| | | | | |
|---|---|---|---|---|
| 4,050,700 A | * | 9/1977 | Lifferth | F16L 21/02 277/316 |
| 4,417,755 A | * | 11/1983 | Gittleman | F16L 21/065 285/423 |
| 2004/0036291 A1 | * | 2/2004 | Dole | F16L 17/04 285/367 |
| 2006/0208486 A1 | * | 9/2006 | Kim | F16L 21/06 285/364 |

* cited by examiner

*Primary Examiner* — James M Hewitt, II
(74) *Attorney, Agent, or Firm* — Schrantz Law Firm, PLLC; Stephen D. Schrantz

(57) ABSTRACT

The adapter assembly extends outward from an inner structure such as an outer barrel or nipple base to attach the inner structure to a housing such as a bowl. Each sized inner structure fits a specified bowl for attachment of the inner structure to the bowl. The adapter assembly extends outward from the inner structure to fit one of the available sizes needed for attachment to the bowl. The adapter assembly is characterized by a first attachment body and a second attachment body. The adapter assembly attaches to the exterior of the inner structure to increase the surface exterior of the outer surface for attachment of the inner structure to the bowl.

19 Claims, 29 Drawing Sheets

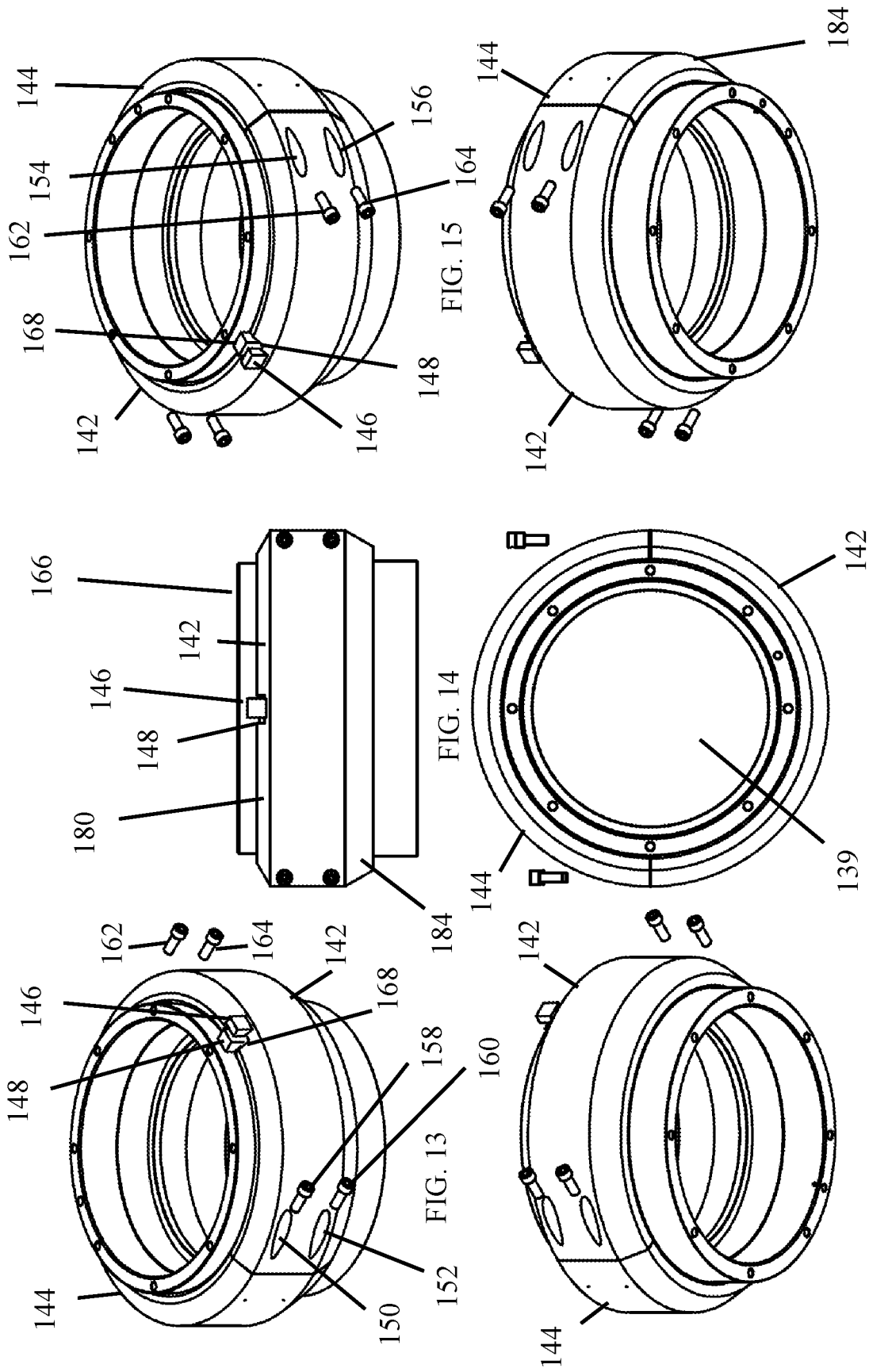

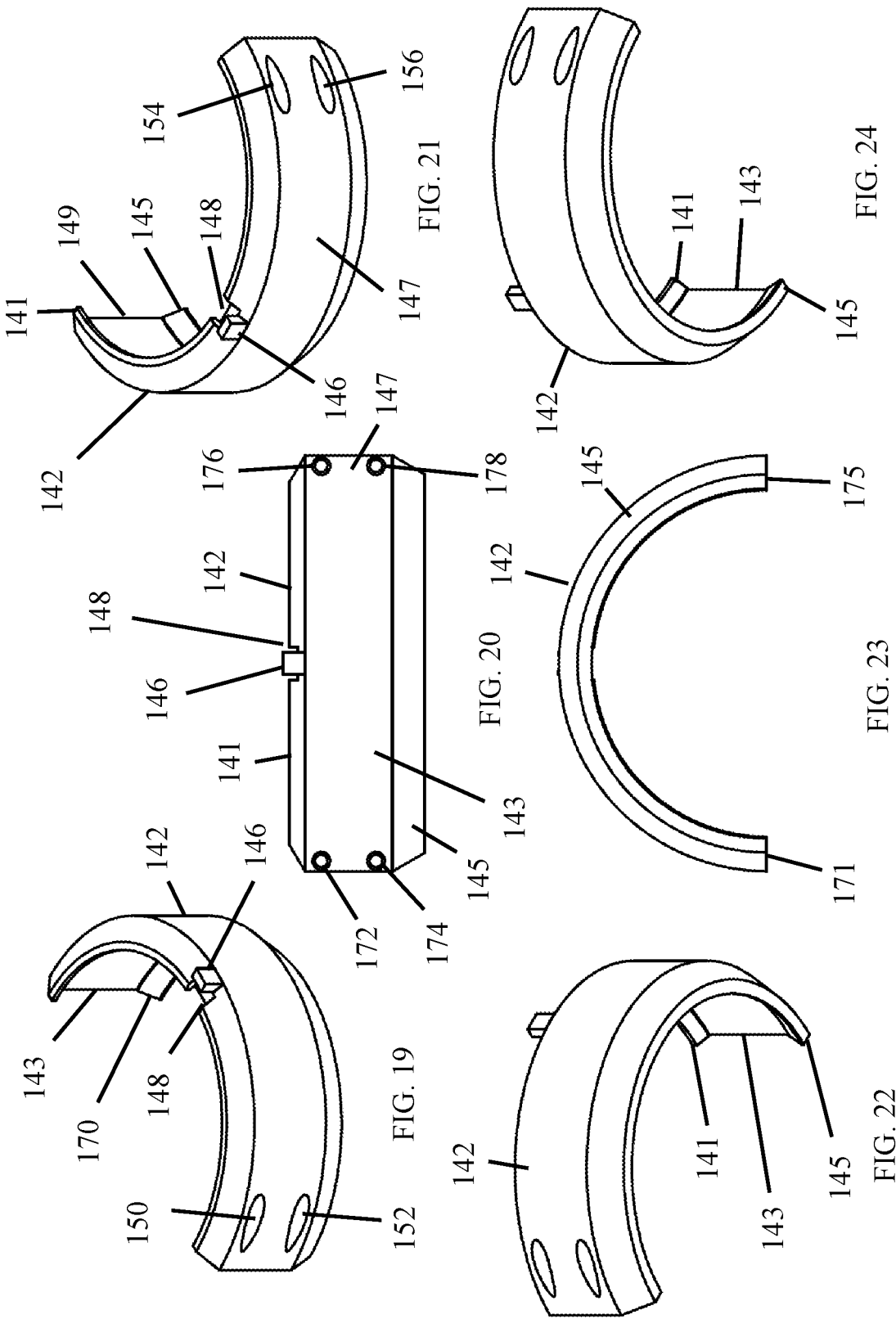

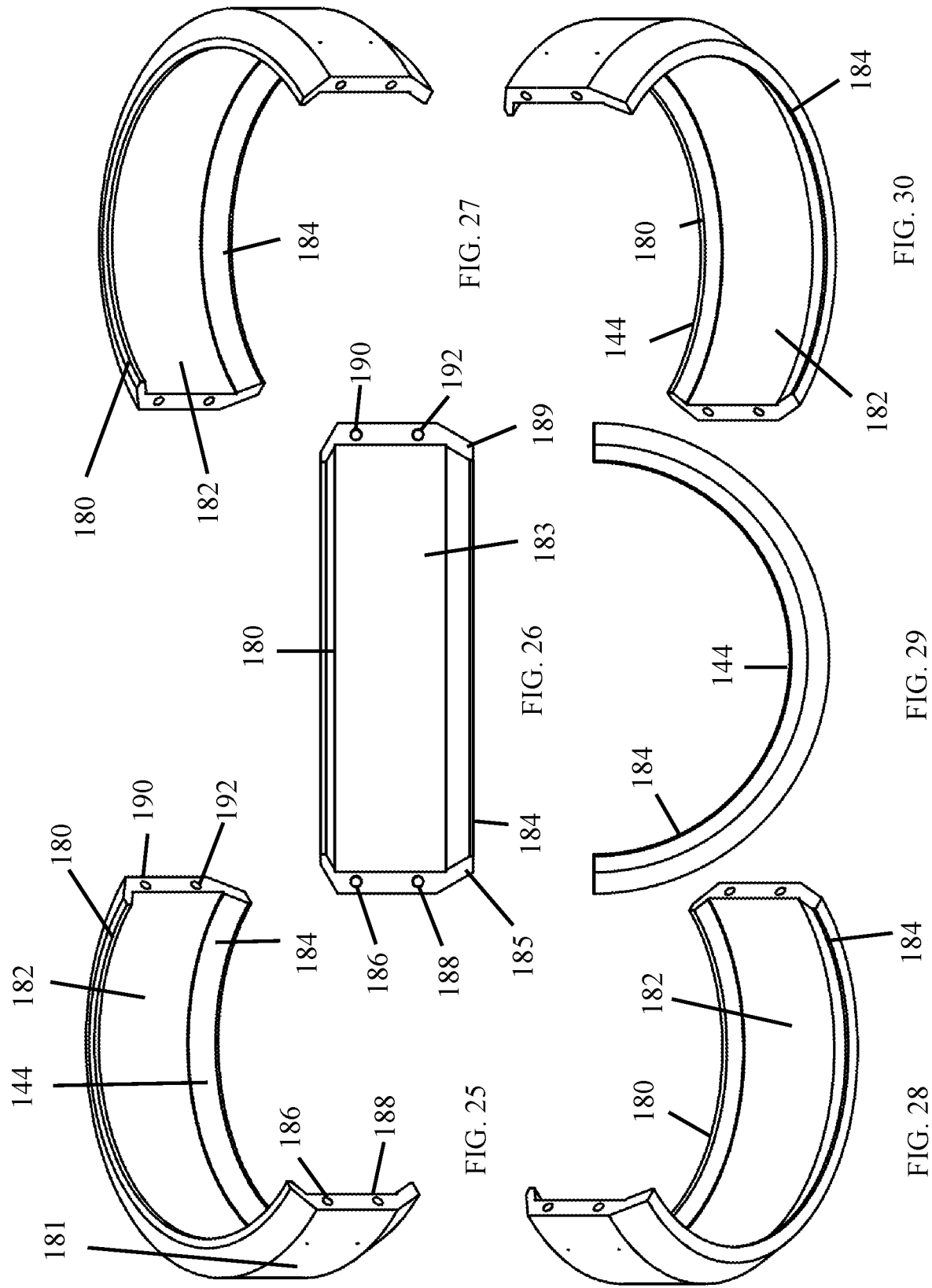

ADAPTER ASSEMBLY

CROSS-REFERENCE TO RELATED APPLICATIONS

This application claims priority to and is a continuation of U.S. patent application Ser. No. 16/531,986 filed on Aug. 5, 2019 entitled "ADAPTER ASSEMBLY" which is a continuation of U.S. patent application Ser. No. 14/919,424 filed on Oct. 21, 2015 entitled "ADAPTER ASSEMBLY" that issued as U.S. Pat. No. 10,371,294 on Aug. 6, 2019, which is a continuation in part of U.S. application Ser. No. 13/199,198 filed on Aug. 22, 2011 entitled "ADAPTER ASSEMBLY" that issued as U.S. Pat. No. 9,243,730 on Jan. 26, 2016, which is a continuation in part of U.S. Application Ser. No. 61/404,152 filed on Sep. 28, 2010 entitled "ADAPTER ASSEMBLY" and U.S. application Ser. No. 29/372,040 filed on Oct. 7, 2010 which issued as U.S. Patent No. D647539 on Oct. 25, 2011 entitled "ADAPTER ASSEMBLY".

This application claims priority to U.S. application Ser. No. 13/199,198 which was filed on Aug. 22, 2011, the same date that U.S. application Ser. No. 13/199,196 entitled "PIPE WIPER BOX" to Grant Pruitt and Cris Braun was filed which was patented as U.S. Pat. No. 8,973,652 and the same date that U.S. application Ser. No. 13/199,197 application entitled "CASING STRIPPER ATTACHMENT" to Grant Pruitt and Cris Braun was filed which was patented as U.S. Pat. No. 8,905,150.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

In well drilling, with a rotary drilling rig, the drill bit and drilling pipe receive rotary motion from power equipment located on the surface. Below the drilling floor, at the ground surface, an assembly known as a rotating head allows the circulation of various fluids used in the drilling. The present invention relates to an adapter assembly. The adapter assembly increases the size of the exterior of the outer barrel for attachment of the outer barrel to a housing such as a bowl.

Drilling heads typically include a stationary body, often referred to as a bowl. The stationary body houses a rotatable spindle, commonly referred to as a bearing assembly. The outer barrel attaches to the bowl. Bowls are available in different sizes depending upon the size of the hole needed for the drilling. Because of the different sized bowls, different sized outer barrels are needed for providing a secure attachment to the bowl. The adapter assembly reduces the required costs of drilling by eliminating the need for different sized outer barrels. To increase the size of the outer barrel, a user attaches an adapter assembly to the exterior of the outer barrel. The increased size of the adapter assembly attached to the outer barrel enables attachment of the outer barrel to the housing, the bowl. The adapter assembly reduces the number of different sized outer barrels required. The adapter assembly configures an outer barrel such that the outer barrel may be used for multiple sized bowls thus decreasing the equipment needed for drilling.

II. Description of the Known Art

Patents and patent applications disclosing information relevant to rotating heads are disclosed below. These patents and patent applications are hereby expressly incorporated by reference in their entirety.

U.S. Pat. No. 7,798,210 ("the '210 patent) issued to Pruitt et al. on Sep. 21, 2010.

U.S. Pat. No. 7,870,896 issued to Pruitt et al. on Jan. 18, 2011.

U.S. Pat. No. 4,511,193 (the '193 patent) issued to Geczy on Apr. 16, 1985 teaches a combined radial and thrust bearing assembly for a down-hole drilling assembly to journal a shaft, mounting the drill bit, in a housing. The bearing assembly taught by the '193 patent is used between a down-hole fluid powered motor and a drill bit for drilling oil wells, for example. The bearing assembly taught by the '193 patent includes cooperative pairs of upper and lower inner races located on the shaft for mutual rotation. Each of the inner races taught by the '193 patent includes a pair of interchangeable toroidal tracks. Cooperative pairs of upper and lower outer races taught by the '193 patent are fixed against rotation in the housing. Each outer race taught by the '193 patent has a pair of interchangeable toroidal tracks to selectively cooperate with the tracks of the inner races to define a toroidal channel to receive a number of bearing balls. Spring means taught by the '193 patent are disposed between the upper and lower pairs of outer races and the housing and between the upper and lower pairs of outer races to provide a compliant coupling for the even distribution of radial and upwardly and downwardly directed thrust loads between the races and balls and eventual transfer to the housing. Drilling fluid taught by the '193 patent is circulated through the bearing assembly for cooling and lubrication.

U.S. Pat. No. 5,213,158 ("the '158 patent") issued to Bailey, et al. on May 25, 1993 teaches a drilling head with dual rotating stripper rubbers designed for high pressure drilling operations ensuring sealing under the extreme conditions of high flow or high pressure wells such as horizontal drilling. The dual stripper rubbers taught by the '158 patent seal on the same diameter yet are manufactured of different materials for different sealing functions. The lower stripper rubber taught by the '158 patent is manufactured from a more rigid, abrasive resistant material to divert the flow from the well. The upper stripper rubber taught by the '158 patent is manufactured of a softer sealing material that will closely conform to the outer diameter of the drill string thereby preventing the flow of fluids through the drilling head.

U.S. Pat. No. 5,647,444 issued to Williams on Jul. 15, 1997 discloses a rotating blowout preventor having at least two rotating stripper rubber seals which provide a continuous seal about a drilling string having drilling string components of varying diameter. A stationary bowl taught by the '444 patent is designed to support a blowout preventor bearing assembly and receives a swivel ball that cooperates with the bowl to self-align the blowout preventor bearing assembly and the swivel ball with respect to the fixed bowl. Chilled water taught by the '444 patent is circulated through the seal boxes of the blowout preventor bearing assembly and liquid such as water is pumped into the bearing assembly annulus between the stripper rubbers to offset well pressure on the stripper rubbers.

U.S. Pat. No. 5,662,181 issued to Williams et al. on Sep. 2, 1997 ("the '181 patent") teaches a rotating blowout preventor having at least two rotating stripper rubber seals which provide a continuous seal about a kelly or drilling string having drilling string components of varying diameter. A stationary housing of the '181 patent is designed to support a bearing assembly and a clamp cooperates with the housing to secure the bearing assembly in the housing.

U.S. Pat. No. 7,198,098 issued to Williams on Apr. 3, 2007 ("the '098 patent") teaches a connector system for connecting parts of an apparatus. The '098 patent teaches a first part having one or more bayonet connectors and one or more retention pin receptacles cooperatively mates to a second part having one or more mating bayonet connectors. The second part taught by the '098 patent further provides one or more retention pin bores. The first and second parts taught by the '098 patent assemble to form a bayonet connection such that at least one pin retention bore aligns with at least one retention pin receptacle. The '098 patent teaches that at least one retention pin assembly disposed through the at least one pin retention bore selectively engages the retention pin receptacle to secure the connection of the first part to the second part of the apparatus.

U.S. Publication No. 20090057024 to Williams on Mar. 5, 2009 ("the '024 publication") teaches an upper stripper rubber canister system that comprises a canister body and a canister body lid. The canister body taught by the '024 publication includes an upper end portion, a lower end portion and a central passage extending therebetween. The central passage taught by the '024 publication is configured for having a stripper rubber assembly disposed therein. The '024 publication teaches an upper end portion of the body that includes a plurality of bayonet connector structures. The canister body lid taught by the '024 publication includes an exterior surface, an upper end portion, a lower end portion and a central passage extending between the end portions thereof. The exterior surface taught by the '024 publication is configured for fitting within the central passage of the canister body. The canister body lid includes a plurality of bayonet connector structures integral with its exterior surface. Each canister body lid bayonet connector structure taught by the '024 publication is configured for being engaged with one of the canister body bayonet connector structures for interlocking the canister body lid with the canister body.

SUMMARY OF THE INVENTION

The adapter assembly of the present invention increases the surface exterior an inner structure, including but not limited to an outer barrel or a nipple base, for attachment of the inner structure to a housing such as a bowl. Inner structures, such as outer barrels and nipple bases, are available in multiple sizes such as a 16 inch, 20 inch, 20 inch oversized, 30 inch, and custom sized. Each sized inner structure fits a specified bowl for attachment of the outer barrel to the bowl. The adapter assembly increases the surface exterior of the inner structure to one of the sizes required for attachment to the bowl. For example, the adapter assembly may extend outward from the 16 inch outer barrel to install the outer barrel within the 20 inch bowl, 20 inch oversized bowl, or the 30 inch bowl, depending on the size of the bowl. Likewise, the adapter assembly may extend outward from the 20 inch outer barrel to install the outer barrel within the 20 inch oversized bowl or the 30 inch bowl, depending on the size of the bowl. In addition, the adapter assembly may extend outward from the 20 inch oversized outer barrel to install the outer barrel within the 30 inch bowl. The adapter assembly may also extend outwards from the outer barrel to install the outer barrel within a custom sized bowl. Therefore, the adapter assembly increases the exterior of the outer barrel for attachment of the outer barrel to the bowl designed for any of the 20 inch, 20 inch oversized, or the 30 inch bowls.

Similarly, the adapter assembly may extend outwards from the nipple base. Another embodiment of the adapter assembly secures around a base, such as a drilling nipple base. The adapter assembly enables different sized bases to be installed within the appropriate bowl similar to the adapter assembly described above.

The present invention reduces the downtime of the drilling rig by reducing time expended replacing different sized bowls or outer barrels.

The present invention reduces the amount of equipment required at a drilling site.

The present invention enables an outer barrel to be retrofitted with an adapter assembly to increase the functionality of the outer barrel.

The present invention enables a base to be retrofitted with an adapter assembly to increase the functionality of the base.

It is an object of the present invention to reduce the equipment needed at a drilling site.

It is another object of the present invention to reduce the costs required for a drilling operation.

It is another object of the present invention to reduce shipping and manufacturing costs required for a drilling operation Another object of the present invention is to allow more efficient assembly and disassembly of the drilling operation.

Another object of the present invention is to allow for the trouble free operation of the drilling operation for the rig personnel.

Another object of the present invention is to create a safer work environment for rig personnel.

Another object of the present invention is to simplify the method of assembly of the drilling operation.

It is another object of the present invention to simplify attachment of the outer barrel to a housing such as a bowl.

It is another object of the present invention to simplify attachment of the base to a housing such as a bowl.

These and other objects of the invention will become more fully apparent as the description proceeds in the following specification and the attached drawings. These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 13 is another top perspective environmental view thereof;

FIG. 14 is a front environmental view thereof;

FIG. 15 is another top perspective environmental view thereof;

FIG. 16 is a bottom perspective environmental view thereof;

FIG. 17 is a bottom environmental view thereof;

FIG. 18 is another bottom perspective environmental view thereof;

FIG. 19 is a top perspective environmental view of an attachment body of one embodiment of the present invention;

FIG. 20 is a front view thereof;

FIG. 21 is another top perspective environmental view thereof;

FIG. 22 is bottom perspective environmental view thereof;

FIG. 23 is a bottom view thereof;

FIG. 24-1 is a top view thereof;

FIG. 24-2 is a rear view thereof;

FIG. 25 is a top perspective environmental view of an attachment body of one embodiment of the present invention;

FIG. 26 is a front view thereof;

FIG. 27 is another top perspective environmental view thereof;

FIG. 28 is bottom perspective environmental view thereof;

FIG. 29 is a bottom view thereof;

FIG. 30-1 is a top view thereof;

FIG. 30-2 is a rear view thereof;

DETAILED DESCRIPTION

Figure 1:
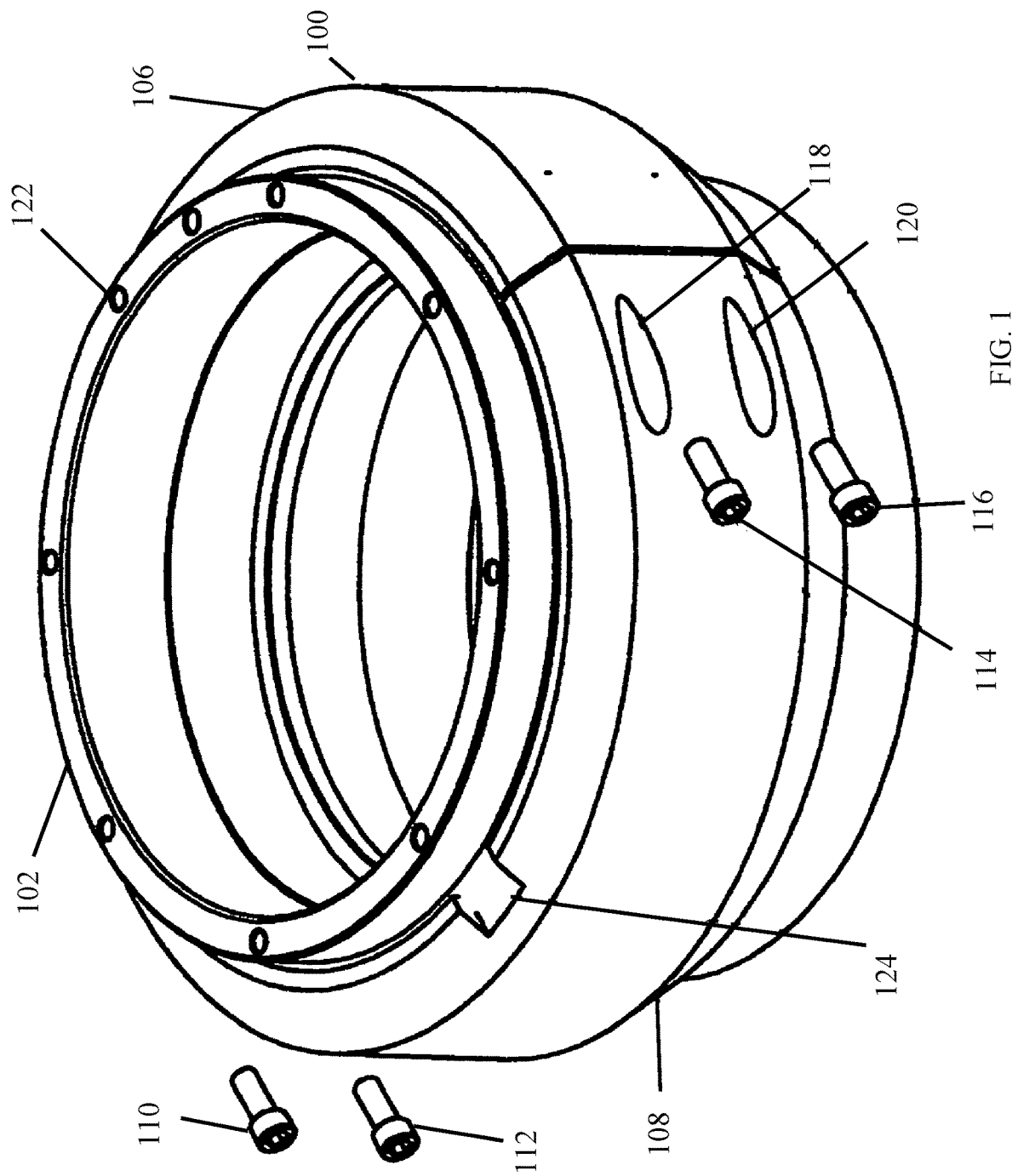
FIG. 1 is an environmental view showing one embodiment of the present invention.

The present invention relates to rotating heads for oil and gas wells and more particularly, to an adapter assembly 100 for attaching an outer barrel 102 to a housing such as bowl 104. Referring to FIG. 1, the adapter assembly of the present invention is generally illustrated by reference numeral 100. The adapter assembly secures around the exterior of an inner structure such as an outer barrel or a base. The inner structure is secured within a central aperture of the attachment assembly, such as central aperture 139 shown in FIGS. 10-11. Outer barrels, such as outer barrel 102, are available in multiple sizes such as the 16 inch, the 20 inch, the 20 inch oversized, and the 30 inch. The adapter assembly 100 extends outward from the outer barrel to enable attachment of an outer barrel to different sized housings such as bowl 102. The adapter assembly 100 is characterized by a first attachment body 106 and a second attachment body 108. The adapter assembly 100 attaches to the exterior of the outer barrel to increase the size of the outer surface for attachment of the outer barrel 102 to the bowl 104.

Outer barrel 102 provides attachment apertures 122 for attachment of drilling tools such as the rotating head to outer barrel 102. The adapter assembly 100 attaches to outer barrel 102 to limit and/or prevent rotation of adapter assembly 100 in relation to outer barrel 102. In one embodiment of the present invention, outer barrel 102 may include a stop dog (not shown). The stop dog of outer barrel 102 enters receiving aperture 124 of adapter assembly 100 to limit and/or prevent rotation of adapter assembly 100 in relation to outer barrel 102. In another embodiment, a locking finger (not shown) of the adapter assembly 100 contacts the stop dog of the outer barrel to limit and/or prevent rotation of the adapter assembly 100 in relation to the outer barrel 102.

Figure 2:
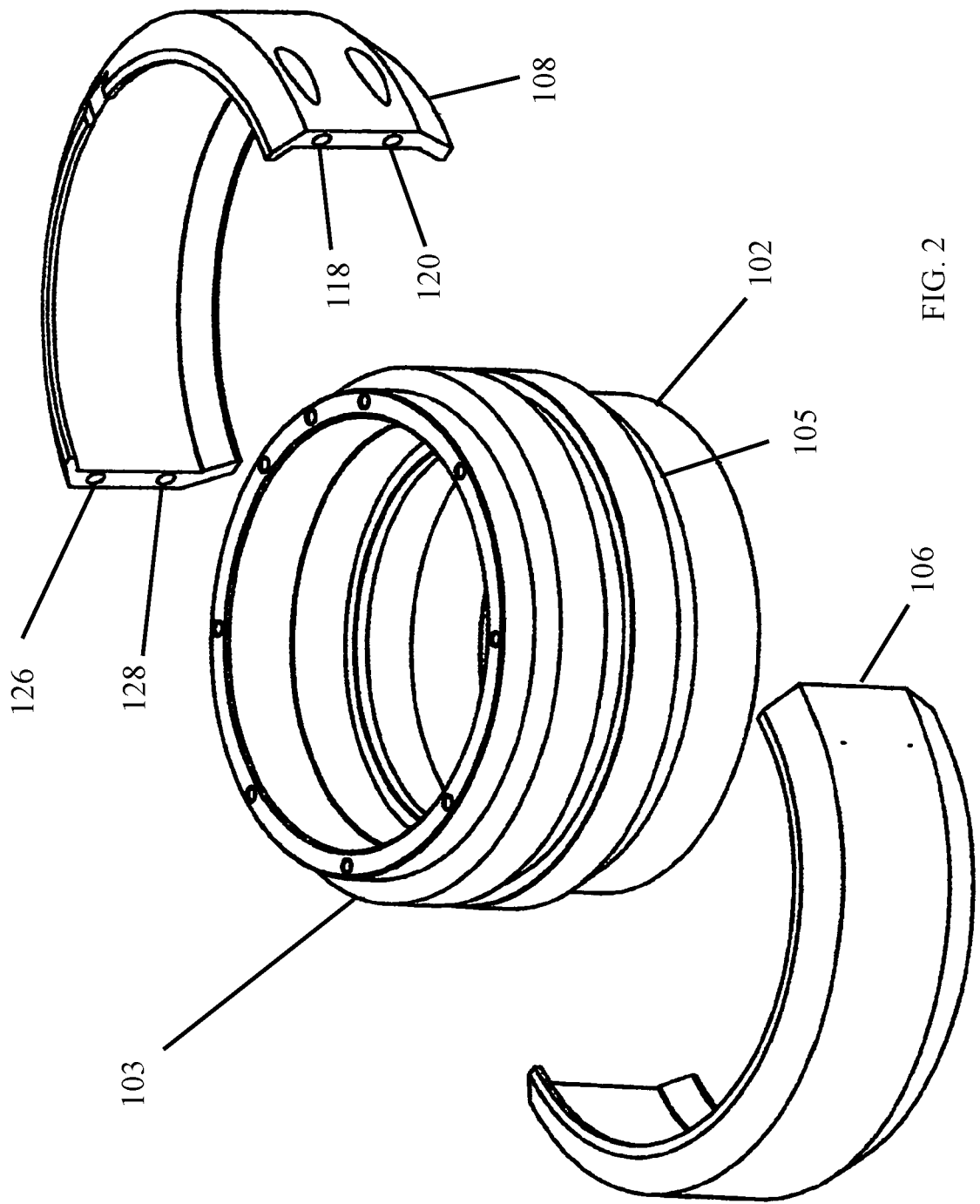
FIG. 2 is another environmental view showing one embodiment of the present invention.
Figure 3:
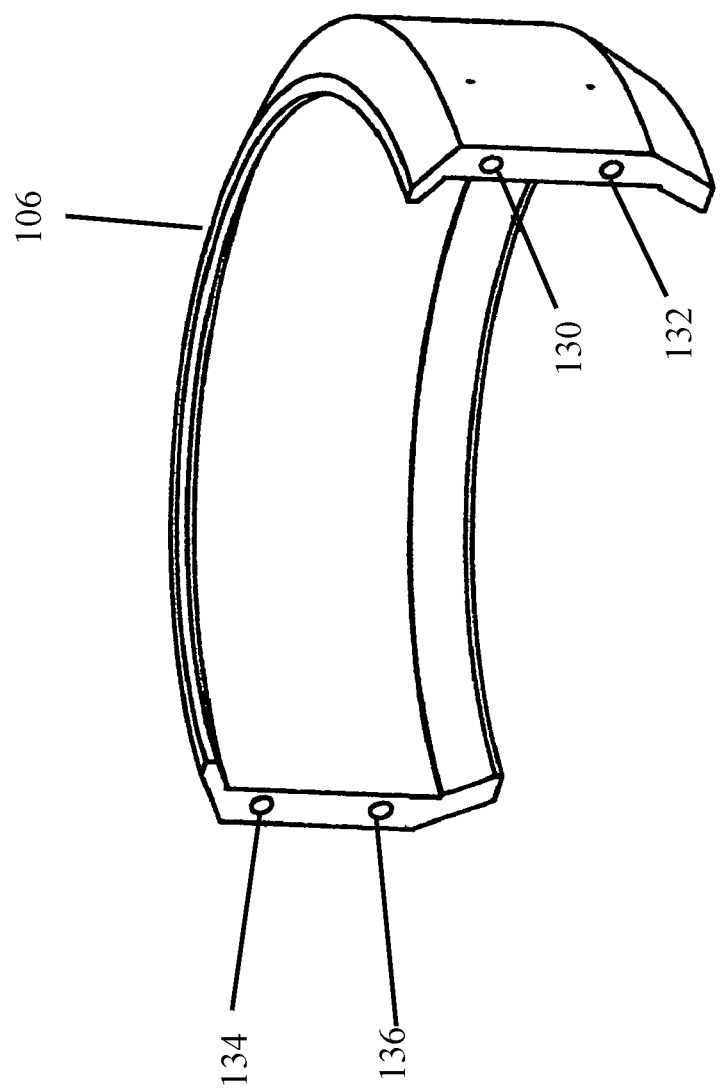
FIG. 3 is a partial view showing a portion of one embodiment of the present invention.

Referring to FIGS. 2 and 3, the first attachment body 106 secures to second attachment body 108 to form the adapter assembly 100. The first attachment body 106 and second attachment body 108 secure to each other to increase the exterior surface. Fasteners 110, 112, 114, 116 enter attachment apertures 118, 120, 126, 128, 130, 132, 134, 136 to attach first attachment body 106 to second attachment body 108 around the exterior of outer barrel 102. In one embodiment, fasteners 110, 112, 114, 116 may include but are not limited to bolts, screws, couplings, or other known fasteners. Attachment apertures 118, 120, 126, 128, 130, 132 may be threaded depending on the fastener that secures first attachment body 106 with second attachment body 108.

Figure 4:
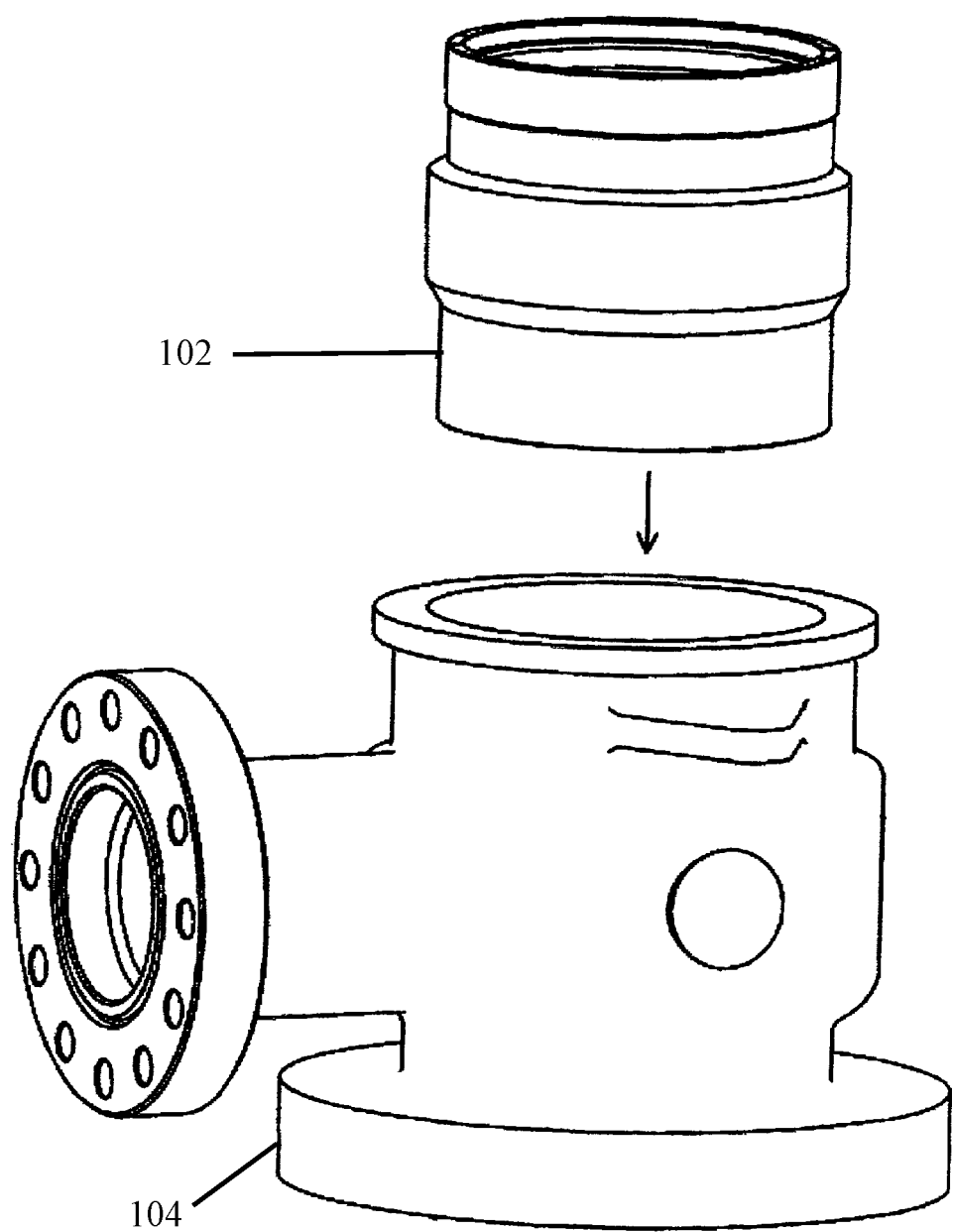
FIG. 4 is an environmental view showing one embodiment of the present invention.
Figure 5:
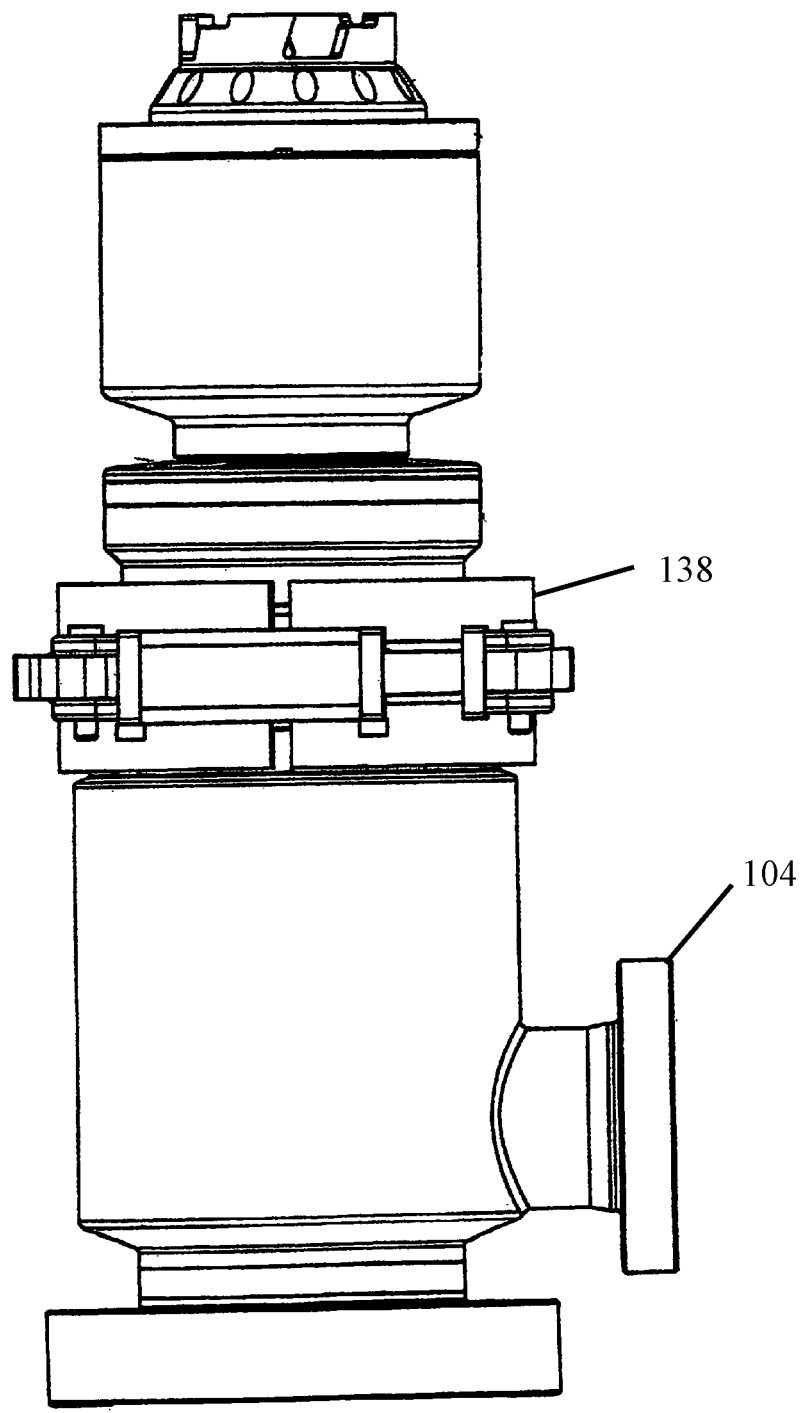
FIG. 5 is another environmental view showing one embodiment of the present invention.
Figure 6:
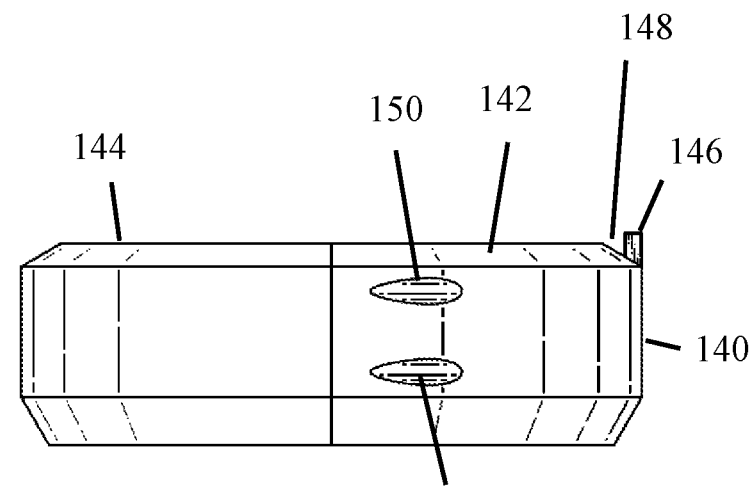
FIG. 6 is a left side view showing one embodiment of the present invention.
Figure 7:
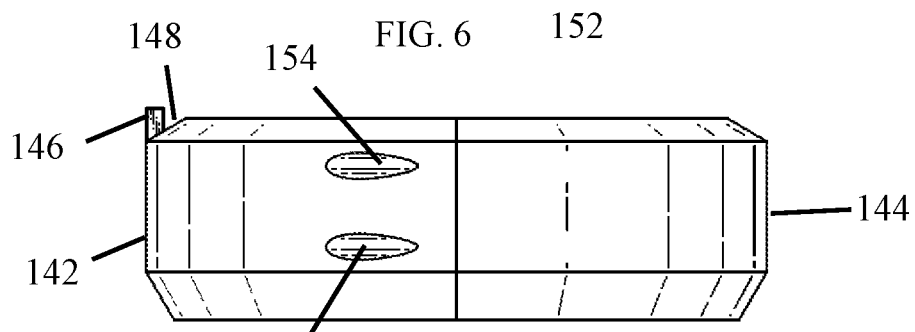
FIG. 7 is a right side view thereof.
Figure 8:
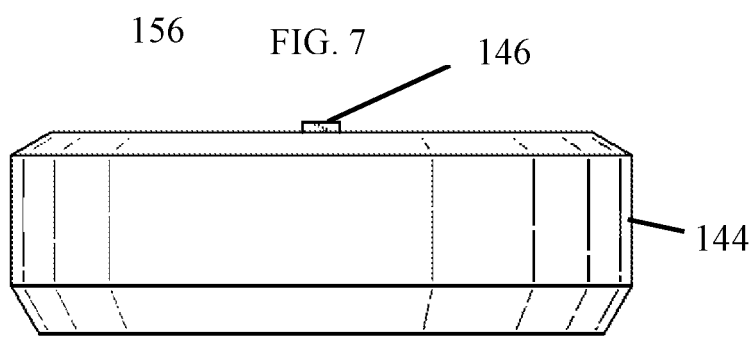
FIG. 8 is a rear view thereof.
Figure 9:
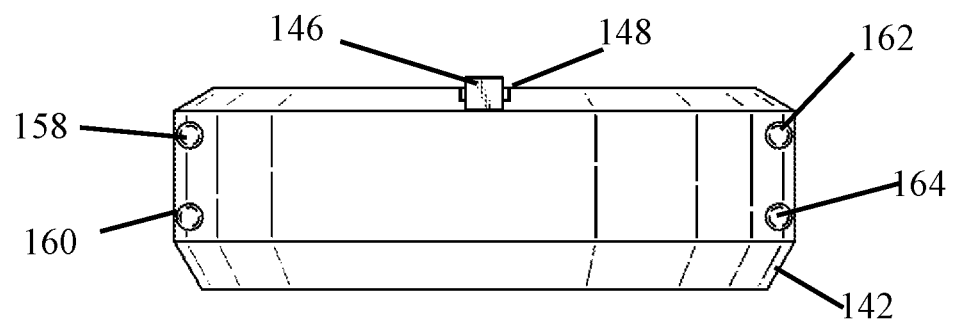
FIG. 9 is a front view thereof.

FIGS. 4 and 5 show the placement of outer barrel 102 within housing 104 or bowl 104. Clamp 138 attaches the adapter assembly 100 and the outer barrel 102 to housing 104 such as bowl 104 to limit and/or prevent rotation of the adapter assembly 100 and the outer barrel 102 in relation to housing, such as bowl 104. Clamp 138 may include a receiving aperture for placement of stop dog to limit and/or prevent rotation of the adapter assembly 100 and the outer barrel 102 in relation to housing, such as bowl 104. Receiving aperture 124 contacts a structure finger (not shown) within the receiving aperture to limit and/or prevent rotation of the adapter assembly 100 and the outer barrel 102 in relation to housing, such as bowl 104. Therefore, clamp finger (not shown) of the clamp 138 limits and/or prevents rotation of the outer barrel with the inner barrel and bearing assembly by contacting stop dog.

FIGS. 6-12 show another embodiment of the present invention. The attachment body 142 attaches to attachment body 144 to form assembly 140. Attachment apertures 150, 152 provide an aperture for placement of fasteners for attaching attachment body 142 to attachment body 144. Similar to the embodiment described above, adapter assembly 140 attaches to outer barrel 166. Adapter assembly provides an exterior and an interior surface which is mostly annular. The upper exterior surface and the lower exterior surface of the adapter assembly 140 slant inwards from the exterior of the adapter assembly. The first attachment body of one embodiment secures with the second attachment body to form a toroid.

Attachment body 142 provides a locking finger 146 extending in an upward direction from the assembly 140. The locking finger 146 is placed within the clamp 138 to limit the movement of the adapter assembly 140 and the outer barrel 166. In one embodiment, the clamp 138 provides a receiving aperture for placement of the locking finger 146. The receiving aperture of the clamp limits movement of the locking finger 146 and adapter assembly 140 in relation to the clamp 138 and the inner structure, such as housing 106. The inner structure may include but not limited to an outer barrel or a nipple base.

Figure 10:
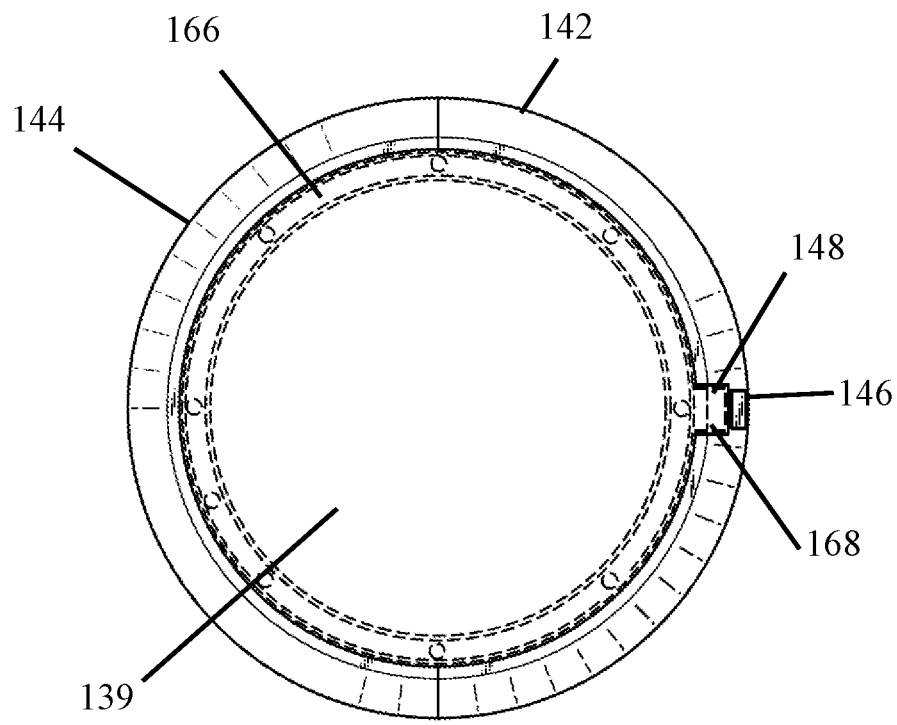
FIG. 10 is a top environmental view thereof.
Figure 11:
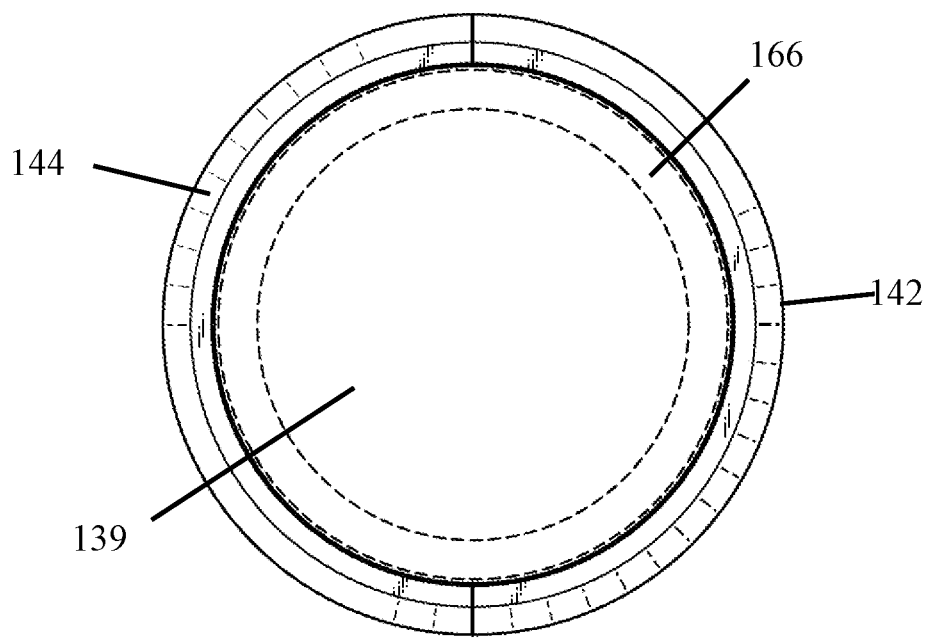
FIG. 11 is a bottom environmental view thereof.

Referring to FIG. 10, adapter assembly 140 also provides a receiving aperture 148. A structure finger 168 of outer barrel 166 fits within receiving aperture 148. In one embodiment, the receiving aperture 148 extends downward into the adapter assembly 140 such that receiving aperture 148 limits the movement of structure finger 168 within receiving aperture 148. The adapter assembly 140 secures around outer barrel 166 such that structure finger 168 is placed within receiving aperture 148 as shown in FIG. 10. FIG. 11 shows a bottom view of the outer barrel 166 placed within attachment bodies 142, 144.

Figure 12:
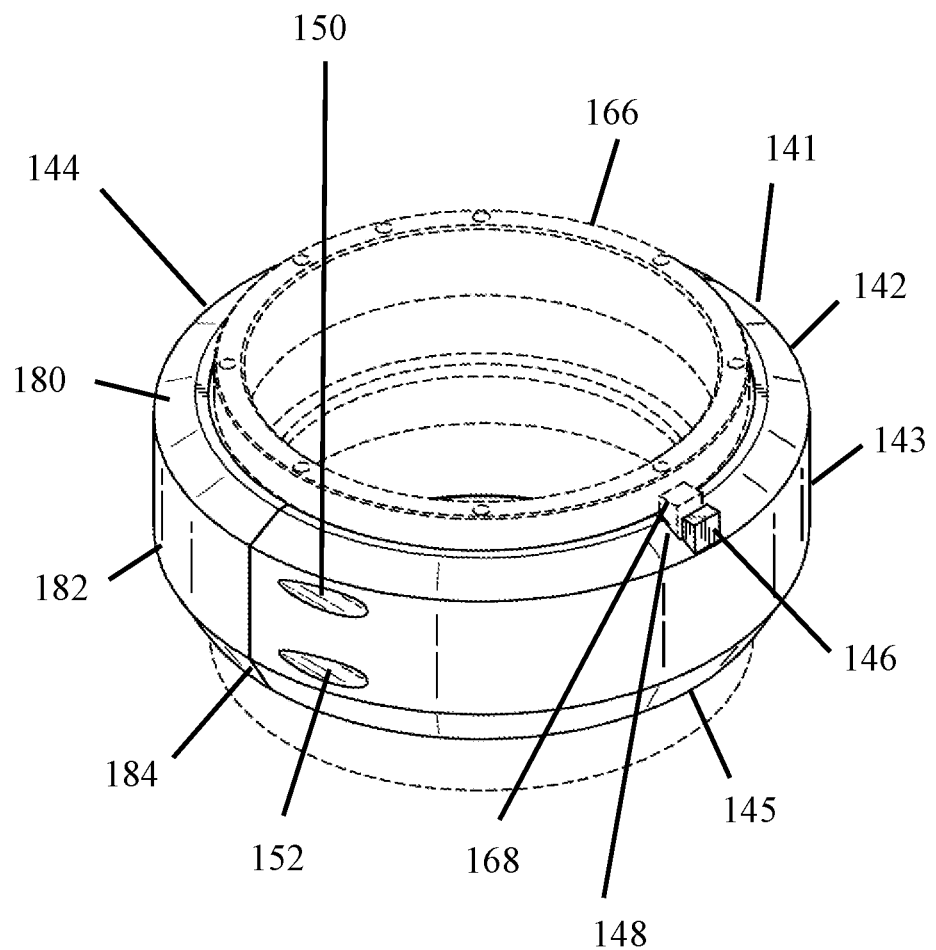
FIG. 12 is a top perspective environmental view thereof.

FIG. 12 shows an environmental view of the attachment assembly 140 secured around the outer barrel 166. In this embodiment, outer barrel 166 is retrofitted with the adapter assembly. Downhole tools pass through the outer barrel. Therefore, one embodiment of the present invention attaches the adapter assembly 140 without any fasteners inserted through the outer barrel 166. Instead, attachment bodies 142, 144, secure to the exterior of the outer barrel 166. Attachment heads 141, 180 of attachment bodies 142, 144 and attachment tails 145, 184 of attachment bodies 142, 144 slant inwards toward the outer barrel 166. In one embodiment, the outer barrel 166 has two extrusions, an upper extrusion 103 and a lower extrusion 105 (shown in FIG. 2). The attachment heads 141, 180 and attachment tails 145, 184 angle inwards with the upper extrusion 103 and lower extrusion 105 of outer barrel 166. The attachment heads 141, 180 limit vertical movement by contacting the upper extrusion 103 and the clamp.

In one embodiment, a sealing gasket is installed between the bowl and the adapter assembly 140. The sealing gasket of this embodiment is placed between the bowl and the adapter at the attachment tails 145, 184 of attachment bodies 142, 144. The sealing gasket seals against the adapter assembly 140 at attachment tails 145, 184. The sealing gasket maintains drilling fluids within the well.

Continuing to refer to FIG. 12, structure finger 168 extends outward from outer barrel 166. In a properly sized bowl, the structure finger 168 contacts the clamp to secure the outer barrel 166 within the bowl. Placement of the structure finger 168 within the clamp limits rotation of the outer barrel in relation to the clamp. The adapter assembly of the present invention enables a user to install an outer barrel within a larger sized bowl. Because the outer barrel would not secure within the larger bowl, the adapter assembly extends outward from the outer barrel for securing the outer barrel within the clamp. In one embodiment of the present invention, locking finger 146, and structure finger 168 are stop dogs.

When placed in a larger bowl, the structure finger 168 of outer barrel 166 does not contact the clamp to limit movement of the outer barrel in relation to the clamp. Instead, the structure finger 168 of outer barrel 166 fits within receiving aperture 148 of attachment body 142. Placement of structure finger 168 within receiving aperture 148 limits rotation of the outer barrel 166 in relation to adapter assembly 140.

Because structure finger 168 does not contact the clamp, locking finger 146 contacts the clamp to limit rotation. Locking finger 146 of attachment body 142 extends outward from attachment body 142 to contact the clamp when the outer barrel is installed in a larger bowl. Placement of locking finger 146 within the clamp limits the rotation of the adapter assembly 140 in relation to the clamp. The structure finger 168 secured within receiving aperture 148 limits the rotation of outer barrel 166 in relation to attachment assembly 140 and the bowl.

FIGS. 13-18 show the adapter assembly 140 installed on the outer barrel 166. Fasteners 158, 160, 162, 164 including but not limited to bolts, screws, and other fasteners secure attachment body 142 with attachment body 144.

FIGS. 19-24 show different views of attachment body 142. Fasteners are installed through attachment apertures 150, 152, 154, 156 and attachment apertures 172, 174, 176, 178 of attachment body 142 shown in FIGS. 20 and 24-2 and attachment apertures 186, 188, 190, 192 of attachment body 144 shown in FIG. 26 to secure attachment body 142 with attachment body 144.

Figures 1, 24:
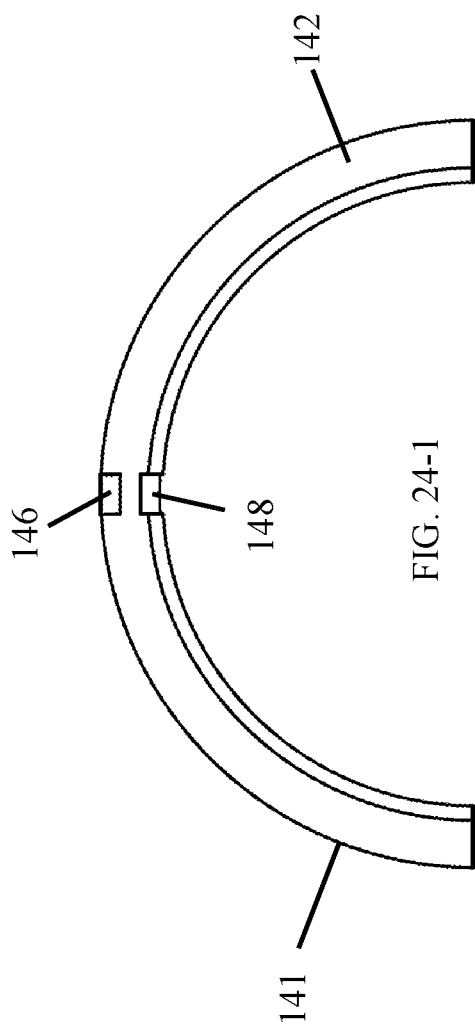
FIG. 24 is a bottom perspective environmental view thereof.
Figures 2, 24:
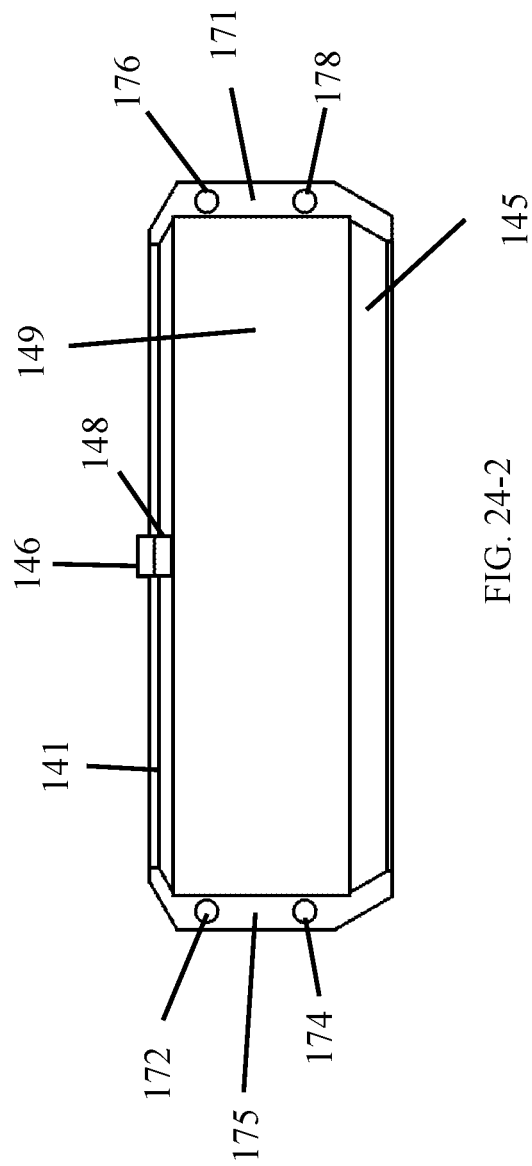
Figures 1, 30:
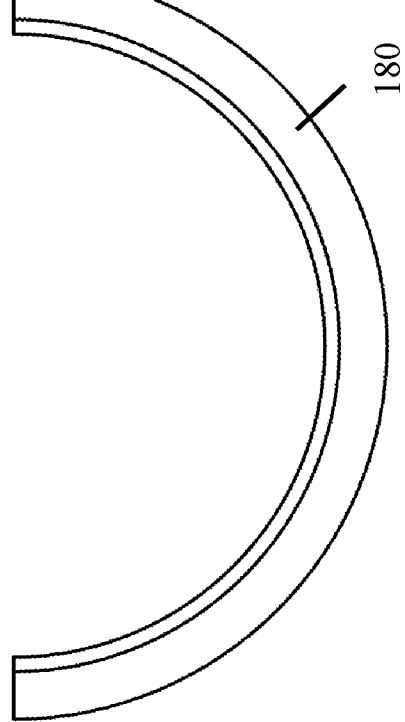
FIG. 30 is a bottom perspective environmental view thereof.
Figures 2, 30:
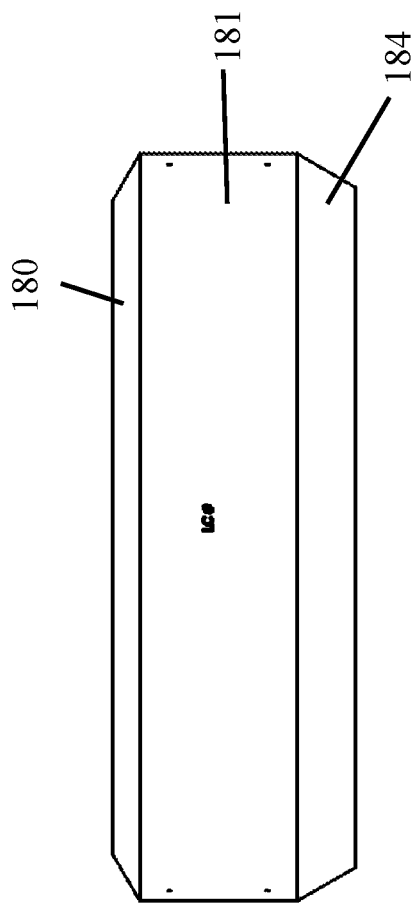

Attachment body 142 forms an open curve. Attachment head 141 also forms an open curve that angles inward. Similarly, attachment tail 145 forms an open curve that angles inward. Curve body 143 of attachment body 142 curves to fit with the curve of outer barrel 166. Curve body has an exterior surface 147 and an interior surface 149. Curve body 143 is an open curve with a first end 171 and a second end 175. Attachment apertures 172, 174, 176, 178 proceed from the exterior surface 147 to the first end 171 and second end 175. The attachment apertures 172, 174, 176, 178 of one embodiment do not pass through the interior surface 149 as shown in FIG. 24-1. In such an embodiment, attachment body 142 prevents fasteners from passing through the interior surface 149 into the central aperture 139 shown in FIG. 17.

FIG. 24-1 shows a top view of attachment body 142. Receiving aperture 148 is located horizontally inward from locking finger 146. Receiving aperture 148 is located adjacent the interior edge of attachment head 141. Locking finger 146 is located adjacent the exterior edge of attachment head 141. In the embodiment shown in FIG. 24-1, locking finger 146 is aligned with receiving aperture 148. In other embodiments, locking finger 146 is not aligned with receiving aperture 148.

FIG. 24-2 shows installation apertures 172, 174, 176, 178. In the embodiment shown, installation apertures 172, 174, 176, 178 do not pass through interior surface 149. FIG. 24-2 also shows the alignment of receiving aperture 148 with locking finger 146.

FIGS. 25-30, 30-1, and 30-2 show different views of attachment body 144. Attachment body 144 forms an open curve. Attachment head 180 also forms an open curve that angles slightly inward. Similarly, attachment tail 184 forms an open curve that angles slightly inward. Curve body 182 of attachment body 144 curves to fit with the curve of outer barrel 166. Curve body 182 has an exterior surface 181 and an interior surface 183. Curve body 182 is an open curve with a first end 185 and a second end 189. Attachment apertures 186, 188, 190, 192 proceed from the first end 185 and second end 189 into the core of curve body 182 between the exterior surface 181 and interior surface 183. The attachment apertures 186, 188, 190, 192 of one embodiment do not pass through the interior surface 175 as shown in FIGS. 25-27. In such an embodiment, attachment body 144 prevents fasteners from passing through the interior surface 175 into the central aperture 139 shown in FIG. 17.

Figure 31:
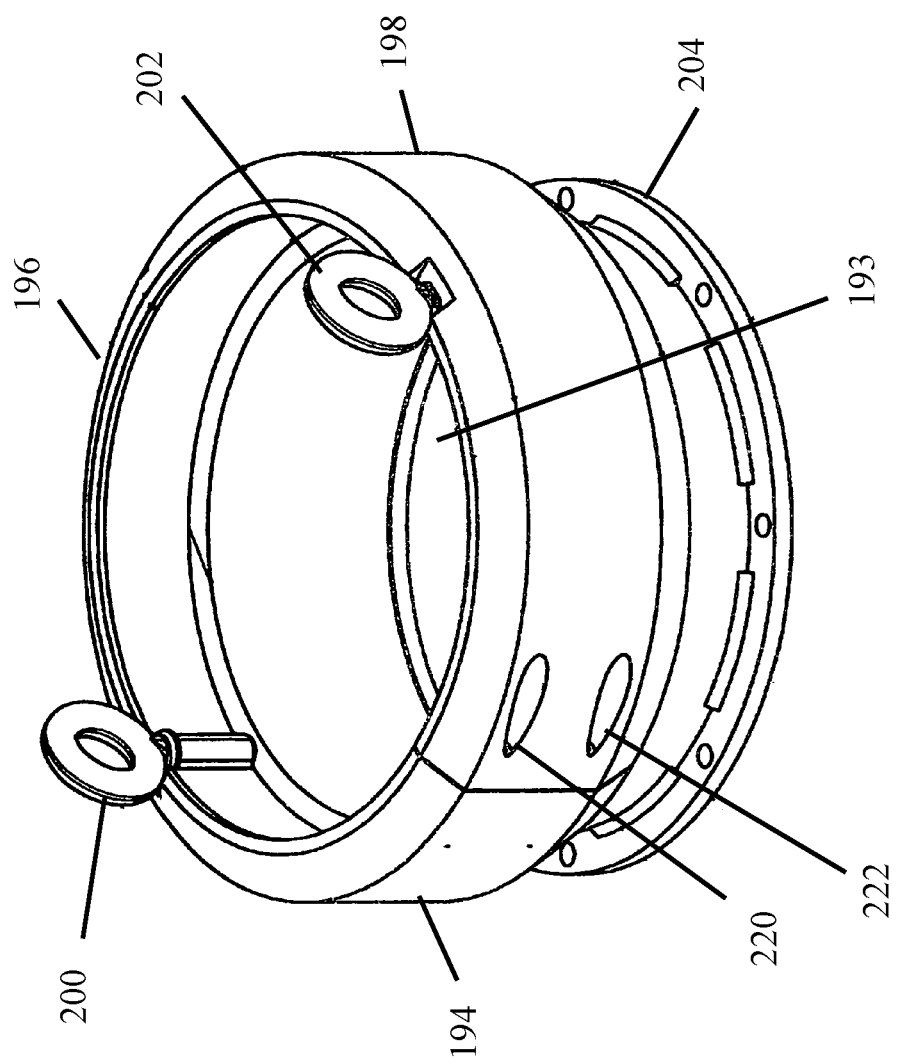
FIG. 31 is a top perspective environmental view of one embodiment of the present invention.

FIG. 31 shows another embodiment of an adapter assembly 194 that secures with a base 204. In one embodiment, the adapter assembly 194 secures with a drilling nipple base 204. The casing passes through the base 204. The adapter assembly 194 shown in FIGS. 31-36 is similar to adapter assembly 140 except that adapter assembly 194 has receiving apertures 216, 218 instead of locking finger 146. Because the base 204 and the casing do not rotate, a locking finger is not required to limit rotation of the adapter assembly 194. Furthermore, adapter assembly 194 may vary in sizes for the different sized bases.

Similar to the adapter assembly described above, attachment body 196 secures to attachment body 198 to form adapter assembly 194. Adapter assembly 194 secures with the base 204 to extend the outer surface of base 204 for attachment within a housing, such as a bowl. The adapter assembly 194 extends outward from the base for securing the base within a larger bowl such as a 20 inch, 20 inch oversized, 30 inch, or customized bowl.

Figure 32:
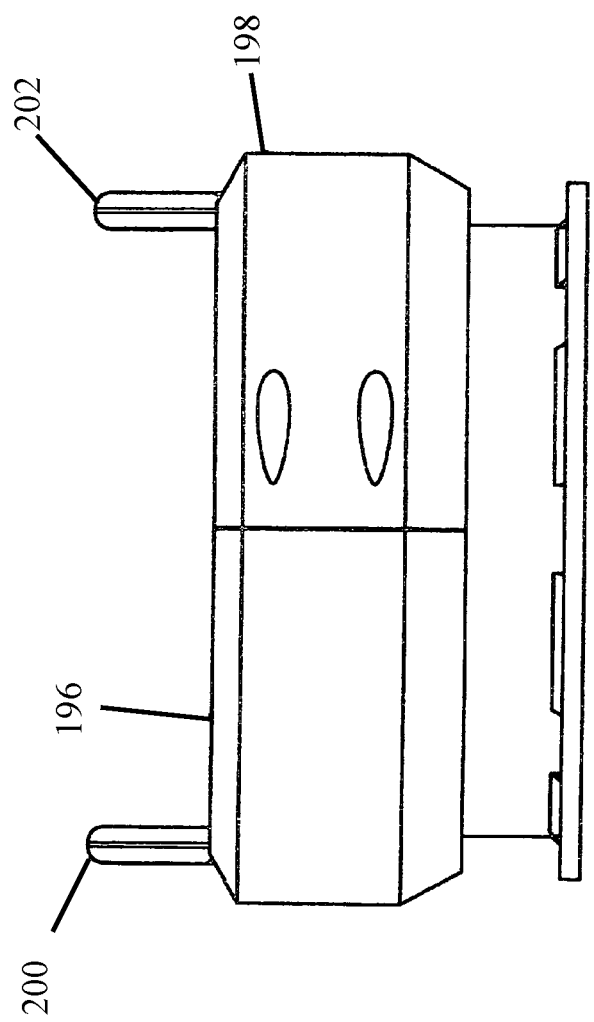
FIG. 32 is a left side environmental view of one embodiment thereof.

FIG. 32 shows the adapter assembly 194 partially enveloping the base 204. Attachment bodies 196, 198 extend horizontally outward from base 204. Attachment bodies 196, 198 secure around the base 204 to extend outward. The clamp secures the adapter assembly 194 and the base 204 within the housing, such as a bowl.

Figure 33:
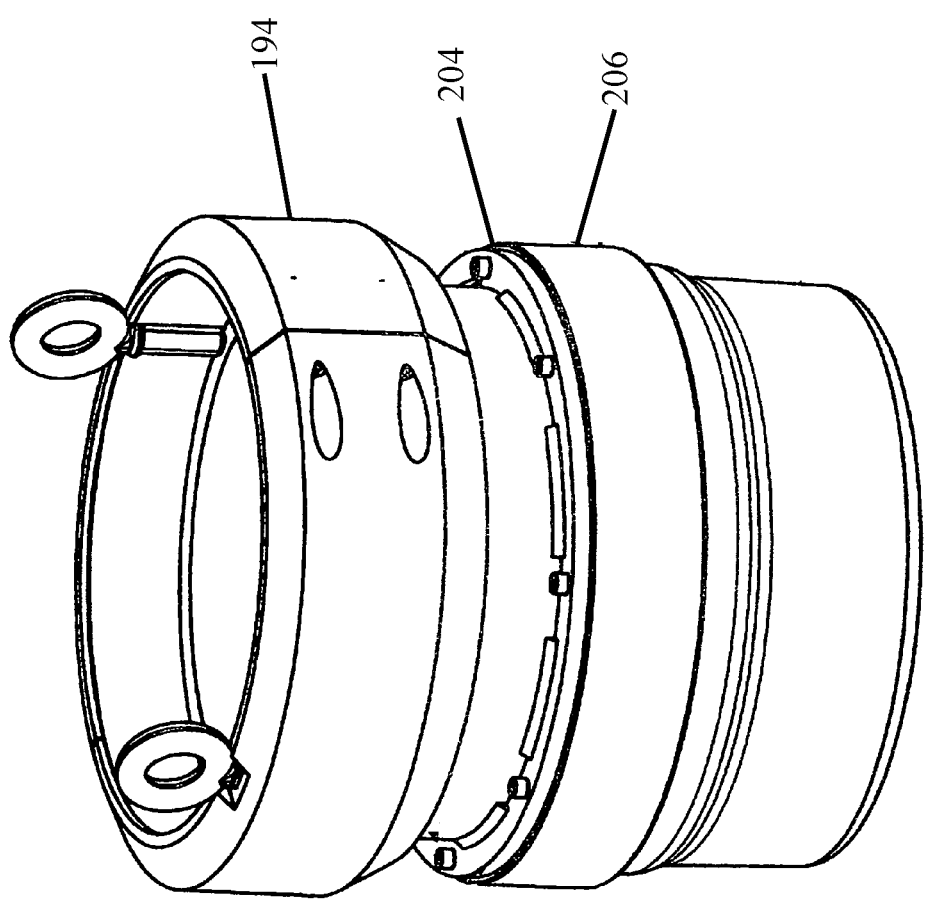
FIG. 33 is another top perspective environmental view thereof.

FIG. 33 shows the attachment of casing rubber 206 to base 204. The clamp secures adapter assembly 194, base 204, and casing rubber 206 within the bowl.

Figure 34:
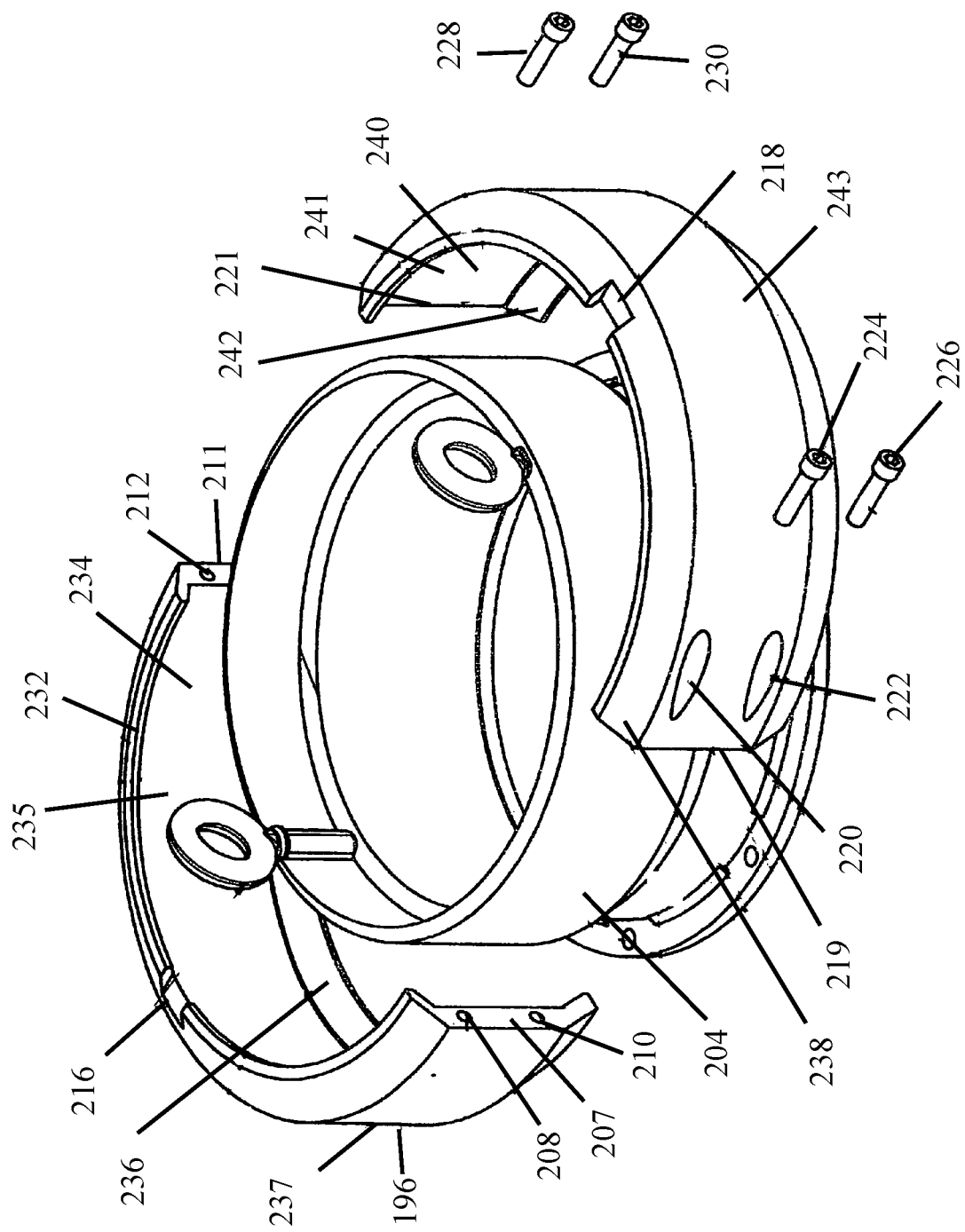
FIG. 34 is an exploded environmental view thereof.
Figure 35:
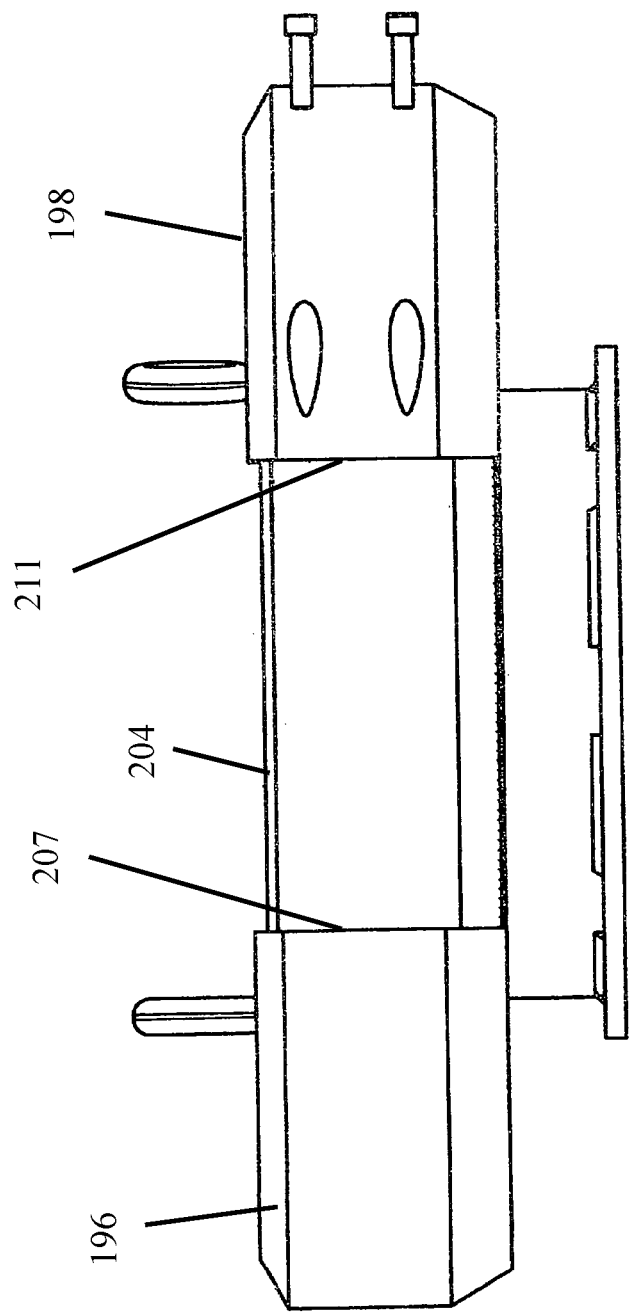
FIG. 35 is another exploded environmental view thereof.
Figure 36:
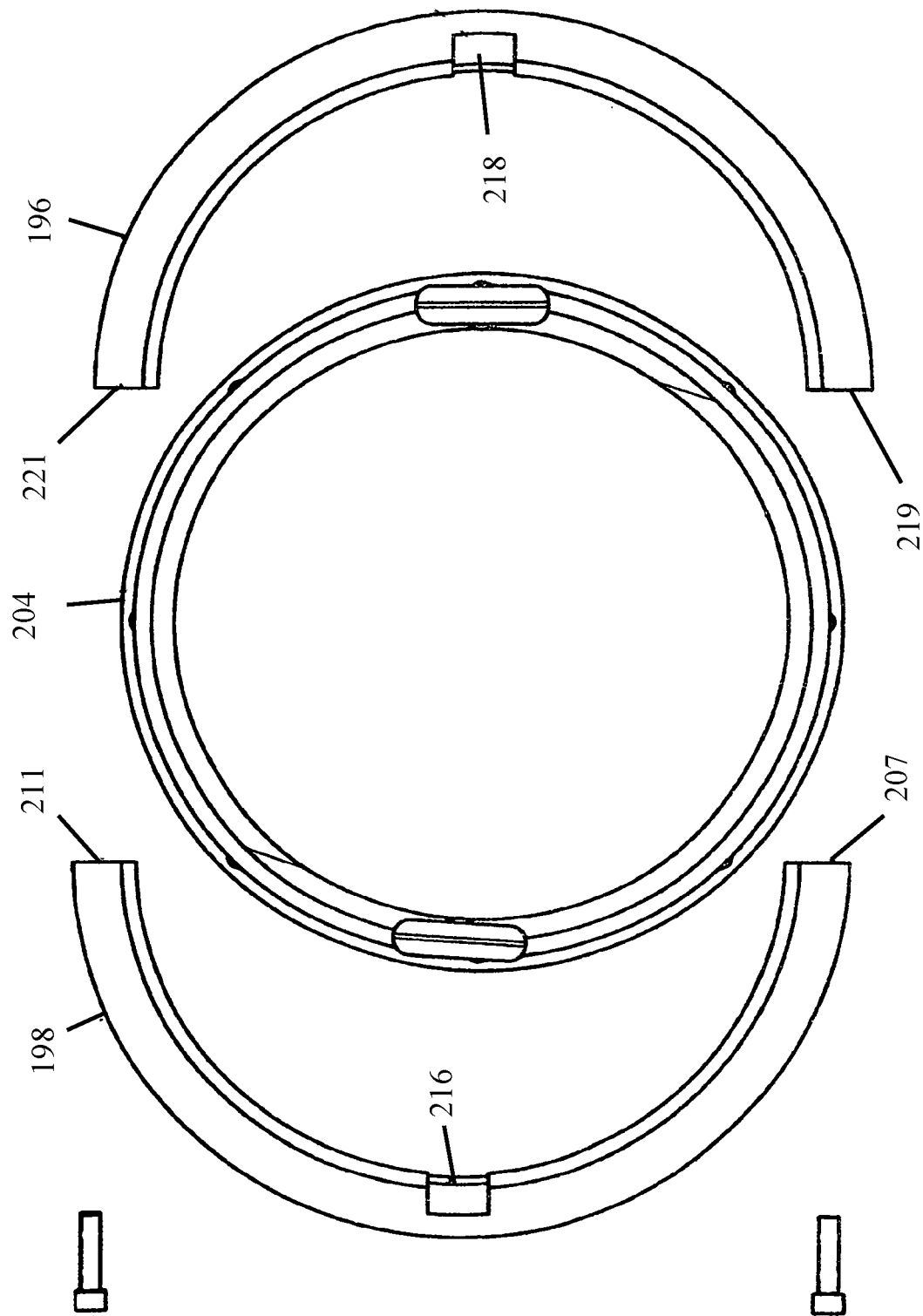
FIG. 36 is an exploded top environmental view thereof.

FIGS. 34-36 show exploded views of the adapter assembly prior to connection of the adapter assembly 194 with the base 204. Similar to the attachment bodies described above, attachment bodies 196, 198 have similar attachment apertures as those described above and shown in FIGS. 12-30. Fasteners 224, 226, 228, 230 including but not limited to bolts, screws, and other fasteners secure attachment body 196 with attachment body 198. Fasteners 224, 226, 228, 230 install through attachment apertures 220, 222, and others of attachment body 198 and attachment apertures 208, 210, 212 (another attachment aperture is located below attachment aperture 212 similar to attachment aperture 210) of attachment body 196 to secure attachment body 196 with attachment body 198.

Attachment heads 141, 180 of attachment bodies 232, 238 and attachment tails 236, 242 of attachment bodies 196, 198 slant inwards toward the base 204. The attachment heads 232, 238 and attachment tails 236, 242 angle inwards for fitting with the base 204. The attachment heads 232, 238 limit vertical movement by contacting the base 204 and the clamp.

In one embodiment, a sealing gasket is installed between the bowl and the adapter assembly 194. The sealing gasket of this embodiment is placed between the bowl and the adapter at the attachment tails 236, 242 of attachment bodies 196, 198. The sealing gasket seals against the adapter assembly 194 at attachment tails 236, 242. The sealing gasket maintains drilling fluids within the well.

Attachment body 196 forms an open curve. Attachment head 232 also forms an open curve that angles inward. Similarly, attachment tail 236 forms an open curve that angles inward. Curve body 234 of attachment body 196 curves to fit with the curve of base 204. Curve body 234 has an exterior surface 237 and an interior surface 235. Curve body 234 is an open curve with a first end 207 and a second end 211. Attachment apertures 208, 210, 212 proceed from the first end 207 and second end 211 into the core of curve body 234 between the exterior surface 237 and interior surface 235. The attachment apertures 208, 210, 212 of one embodiment do not pass through the interior surface 235. In such an embodiment, attachment body 196 prevents fasteners from passing through the interior surface 235 into the central aperture 193.

Similarly, attachment body 198 forms an open curve. Attachment head 238 also forms an open curve that angles slightly inward. Similarly, attachment tail 242 forms an open curve that angles slightly inward. Curve body 240 of attachment body 198 curves to fit with the curve of base 204. Curve body 240 has an exterior surface 243 and an interior surface 241. Curve body 240 is an open curve with a first end 219 and a second end 221. Attachment apertures 220, 222 of first end 219 and similar attachment apertures of second end 221 proceed from the exterior surface 243 to the first end 219 and second end 221. The attachment apertures 220, 222 of one embodiment do not pass through the interior surface 241. In such an embodiment, attachment body 198 prevents fasteners from passing through the interior surface 241 into the central aperture 193.

Continuing to refer to FIGS. 34-36, receiving apertures 216, 218 provide an indentation for receiving lift eyes 200, 202. Because attachment heads 232, 238 extend above base 204, receiving apertures 216, 218 allow passage of the attachment bodies 196, 198 around base 204 for attachment of attachment body 196 with attachment body 198.

FIGS. 37-51 show another embodiment of the adapter assembly 300. Adapter assembly 300 is sized larger such that the increased weight of the adapter assembly is too great for a single person to comfortably handle. The adapter assembly 300 is hollow to reduce the weight to simplify the use of the adapter assembly 300. The adapter assembly 300 is a lightweight solution for a large 30 inch bowl to accept a standard sized rotating control head.

The rotary table diameter may prevent a solid 30 inch diameter rotating control head to pass through the rotary table. Therefore, a light weight design is needed for installation underneath the rig floor. The adapter assembly 300 serves such purpose. The reduced weight of the two attachment bodies 302, 304 enables two users to install the attachment bodies 302, 304 around the rotating control head under the rig floor.

The smaller head is lowered through the rig floor. The users then install the attachment bodies 302, 304 around the head to increase the size of the head to be inserted into the bowl. The adapter assembly 300 increases the size of the head to properly fit the bowl. Users install adapter assembly 300 to increase the size of the head prior to inserting the head into the bowl.

Figure 37:
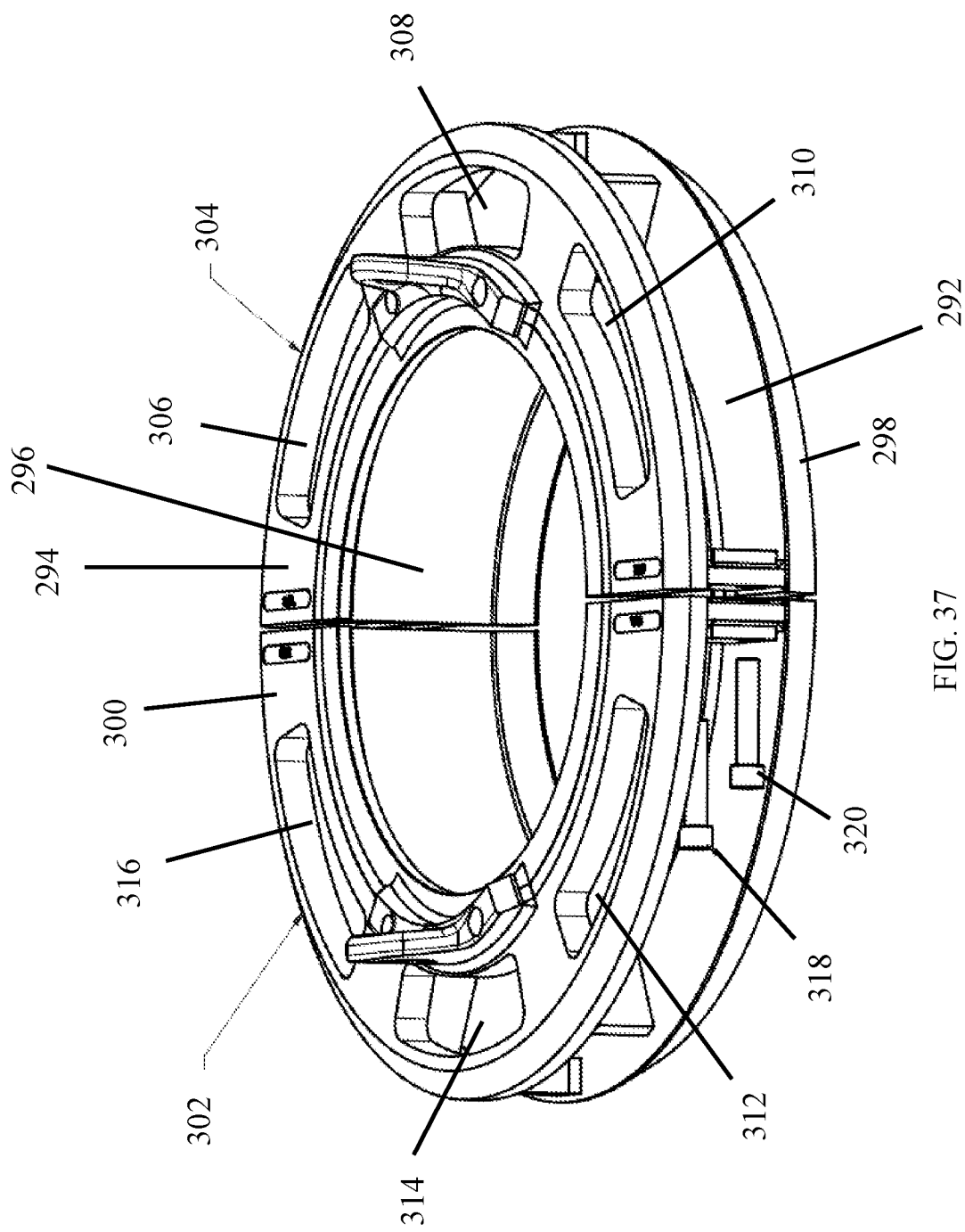
FIG. 37 is a perspective view of an adapter assembly of one embodiment of the present invention.

FIG. 37 shows attachment bodies 302, 304. The tops 294 of the attachment bodies 302, 304 are hollowed out by apertures 306, 308, 310, 312, 314, 316. The floor 298 of the attachment bodies 302, 304 of one embodiment are solid with spacing 292 between the top 294 and floor 298. The spacing 292 between top 294 and bottom 298 further reduces the weight of adapter assembly 300.

Interior wall 296 is located on the radially inner portion of the attachment bodies 302, 304. The interior wall 296 separates the top 294 from the floor 298. The supports extend radially outward from the interior wall 296. The supports extend axially between the top 294 from the floor 298. The interior wall 296 forms an opening in which the rotating control head is inserted such that the head runs axially through the adapter assembly 300.

Attachment bodies 302, 304 attach together to form adapter assembly 300. The two attachment bodies 302, 304 secure to each other around the rotating control head. Fasteners 318, 320, such as threaded fasteners, bolts, etc., secure the two attachment bodies 302, 304 to each other.

Figure 39:
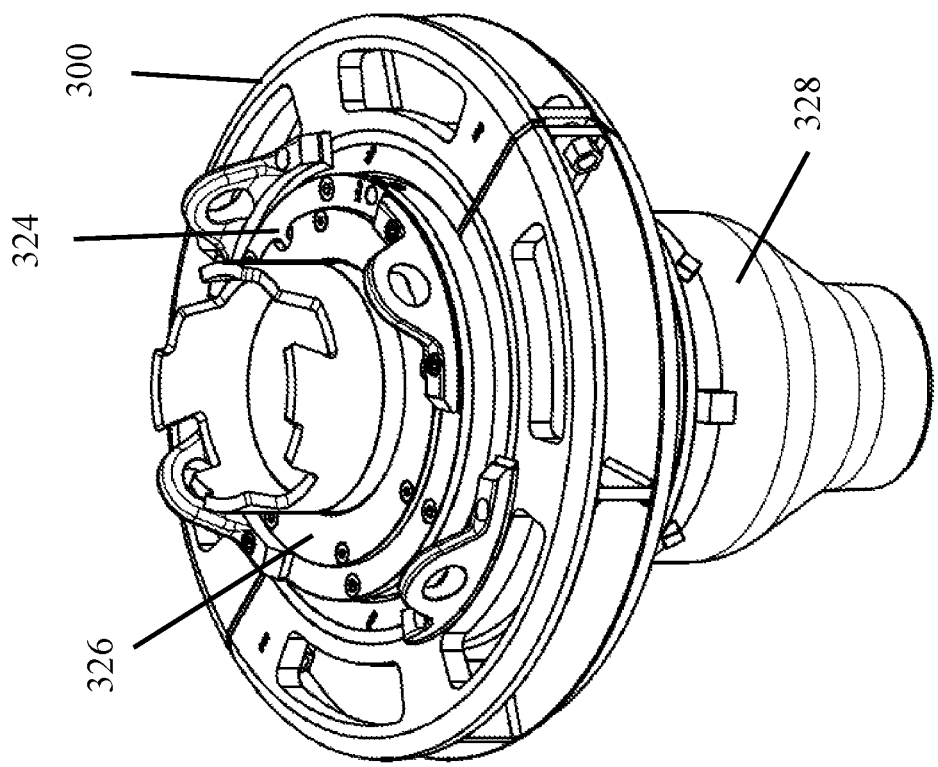
FIG. 39 is an environmental view of one embodiment of the present invention.
Figure 38:
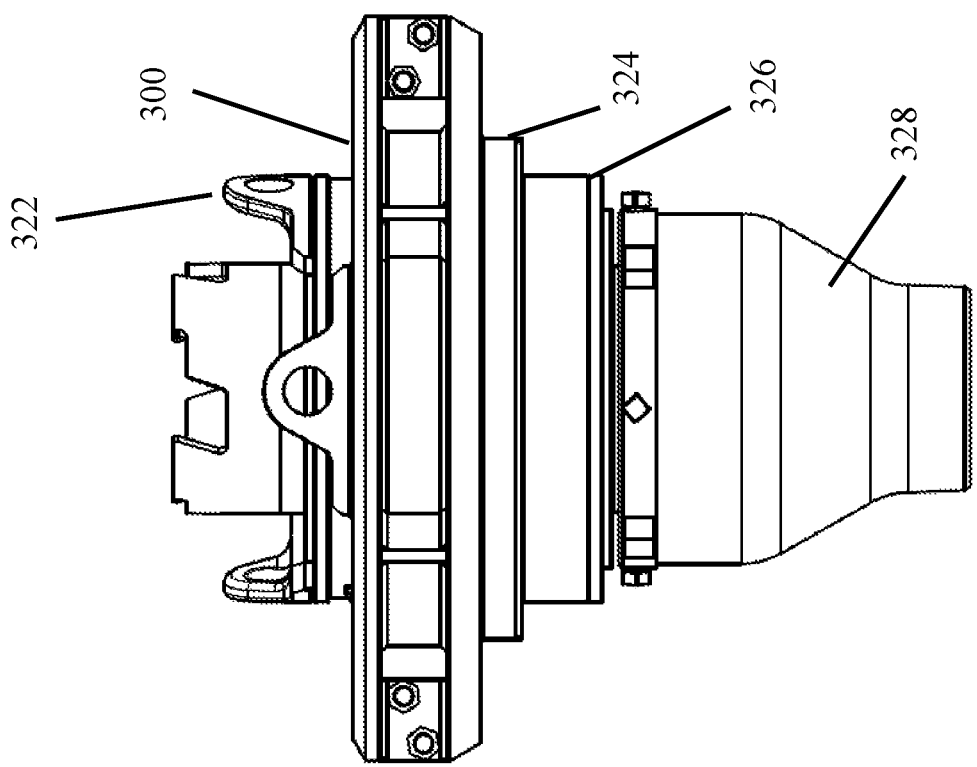
FIG. 38 is an environmental view of one embodiment of the present invention.

FIGS. 38-39 show the adapter assembly 300 secured around the rotating control head 322. The adapter assembly 300 secures around an inner structure, such as outer barrel 324. The inner barrel 326 located radially inward from the outer barrel 324 rotates while outer barrel 324 and adapter assembly 300 remain stationary. Rubber 328 attaches to the inner barrel 326 to rotate with inner barrel 326.

Figures 40, 41:
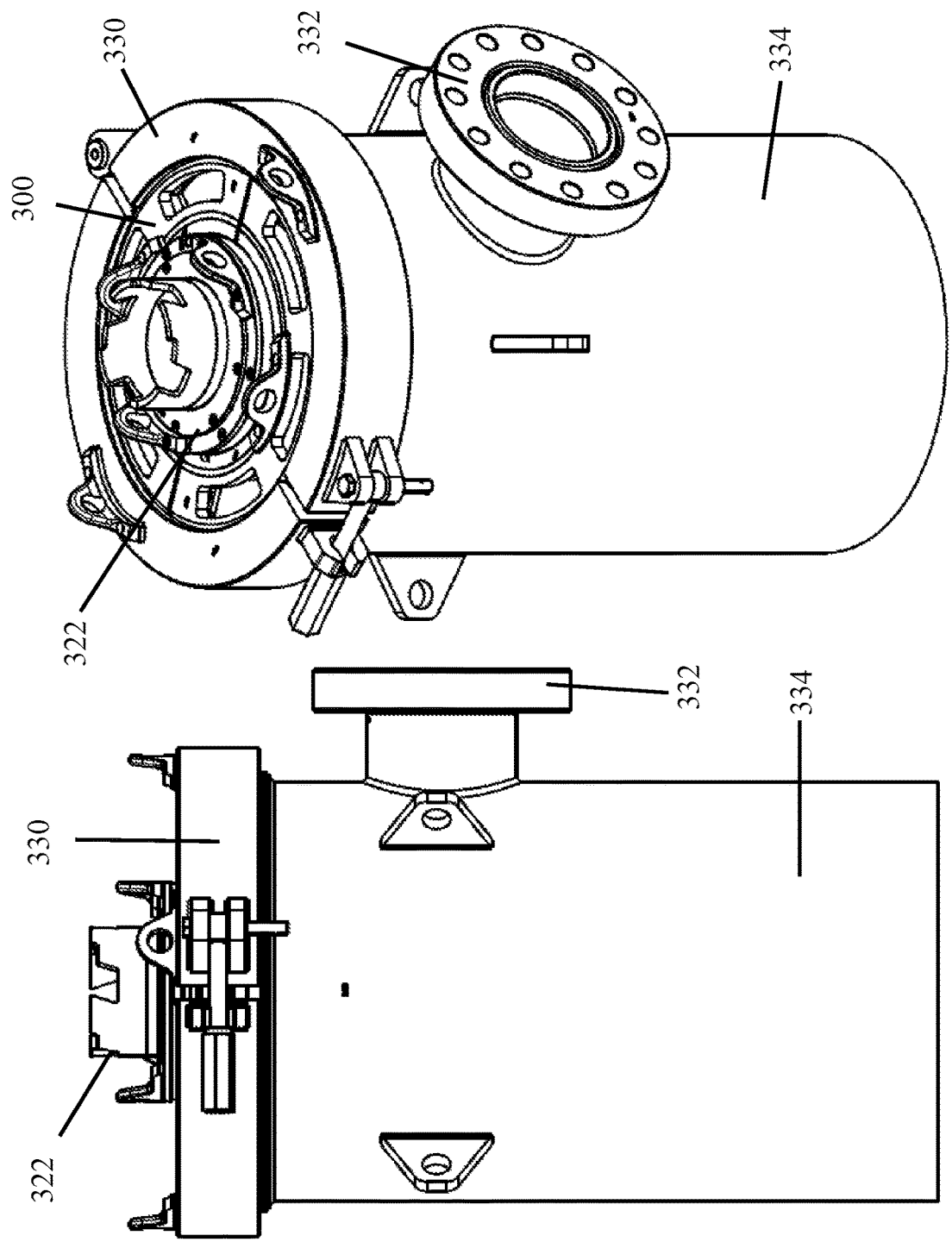
FIG. 40 is an environmental view of one embodiment of the present invention.
FIG. 41 is an environmental view of one embodiment of the present invention.
Figure 43:
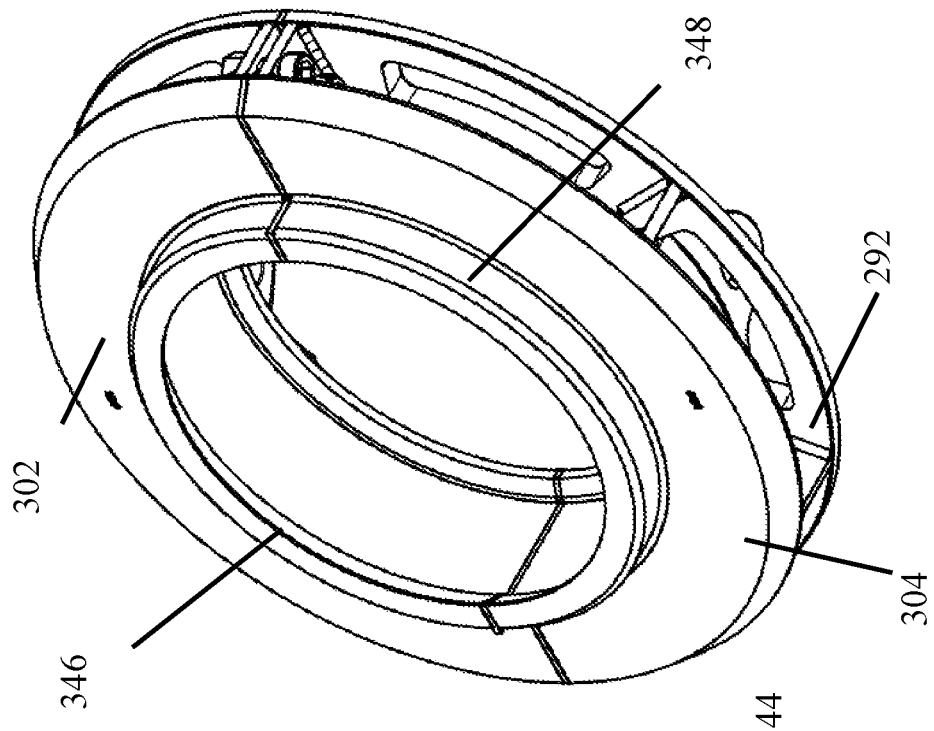
FIG. 43 is a bottom perspective thereof.

FIGS. 40-41 show the rotating control head 322 and the adapter assembly 300 secured within a housing, such as the bowl 334. The bowl 334 is sized larger than the rotating control head 322. The adapter assembly 300 increases the size of the head 322 to be properly secured within the bowl 334. Clamp 330 secures the adapter assembly 300 within the bowl 334. Bowl 330 provides a flanged outlet 332.

Figure 42:
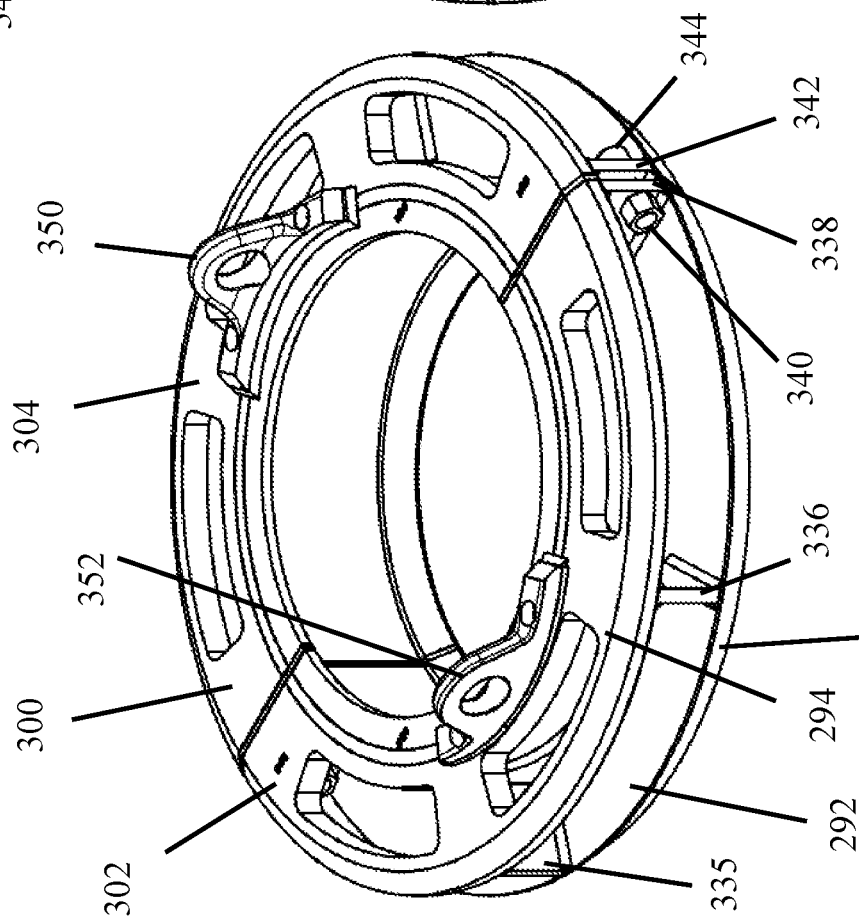
FIG. 42 is a top perspective view of one embodiment of the present invention.

FIG. 42 shows the spacing 292 between the top 294 and floor 298. Supports 335, 336, 338, 342 provide the additional support needed between top 294 and floor 298. Supports 335, 336, 338, 342 increase the strength of the adapter assembly 300.

Nut 340 is secured to support 338. In one embodiment, the nut 340 is welded to support 338. The fasteners 318, 320 insert into aperture 344 of support 342. The fasteners 318, 320 secure the attachment bodies 302, 304 to each other via nut 340. The nuts 340 are located on supports. In one embodiment, four fasteners, such as bolts, and four nuts secure the attachment bodies 302, 304 to each other.

Legs 346, 348 extend axially downwards from the floor of the attachment bodies 302, 304. The legs 346, 348 increase the contact with the rotating control head to better secure the adapter assembly 300 to the rotating control head.

Figure 44:
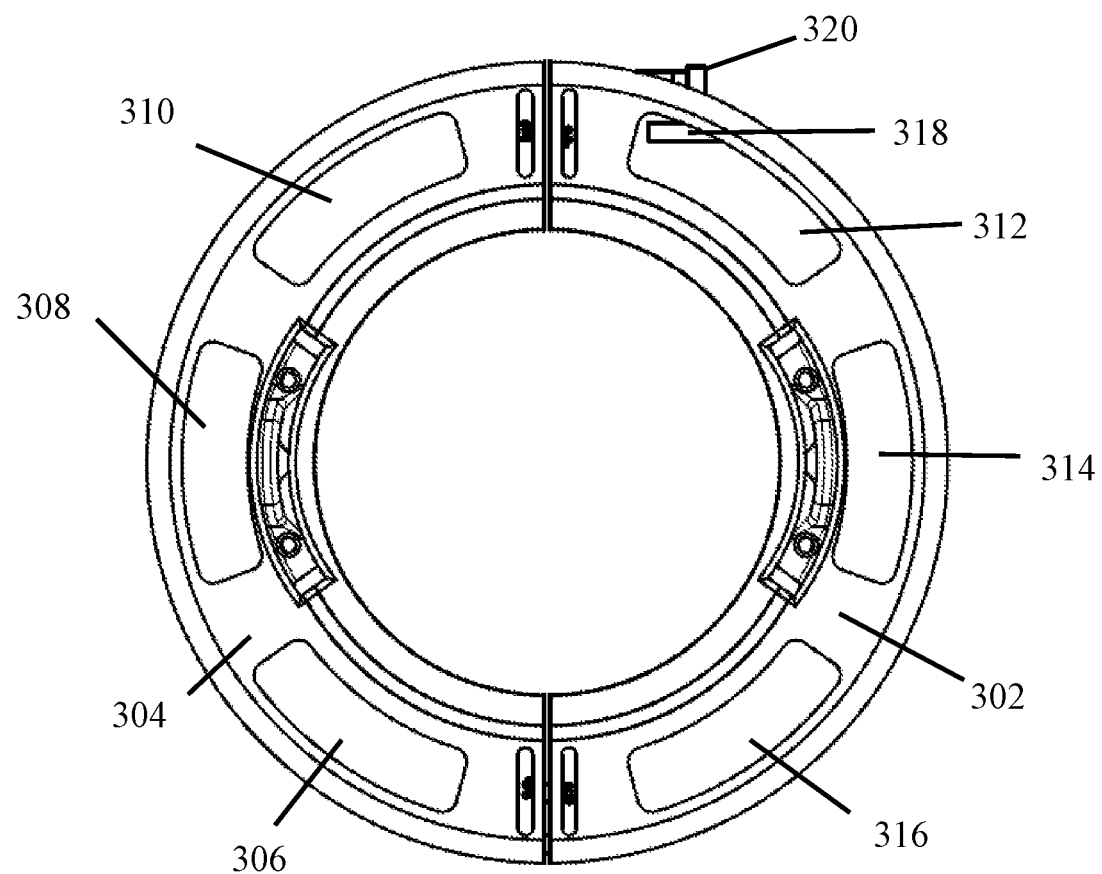
FIG. 44 is a top view thereof.

FIG. 44 shows apertures 306, 308, 310, 312, 314, 316 of attachment bodies 302, 304. Fasteners 318, 320 insert into the apertures and corresponding nuts located on each edge of the attachment bodies 302, 304. Another set of fasteners are inserted on the opposite side to secure the other end of the attachment bodies 302, 304.

Figure 45:
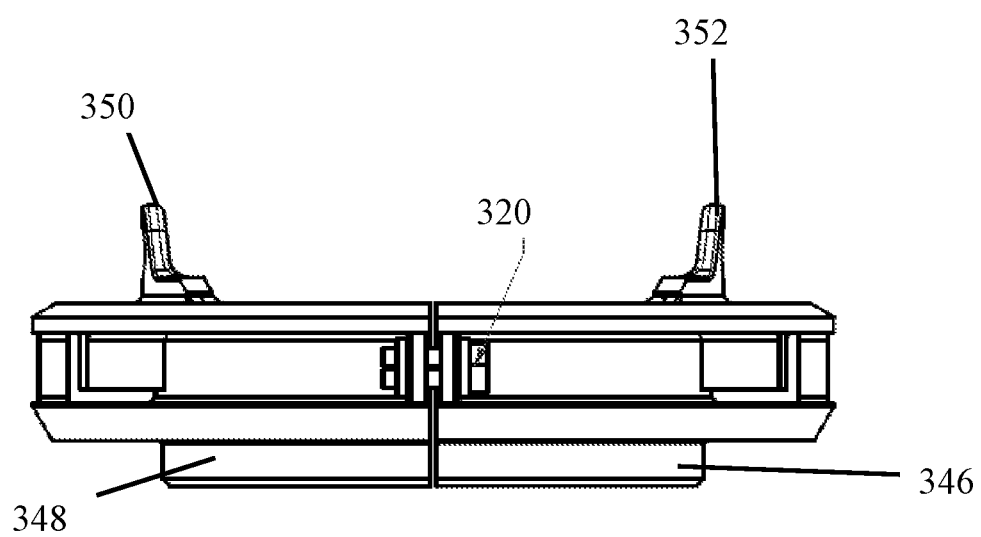
FIG. 45 is a left side view thereof, the right side view being a mirror image of the left side view.

FIG. 45 shows the fasteners 320 that secure the attachment bodies to each other. Lifting eyes 350, 352 provide a contact area for lifting the attachment assembly.

Figures 46, 47:
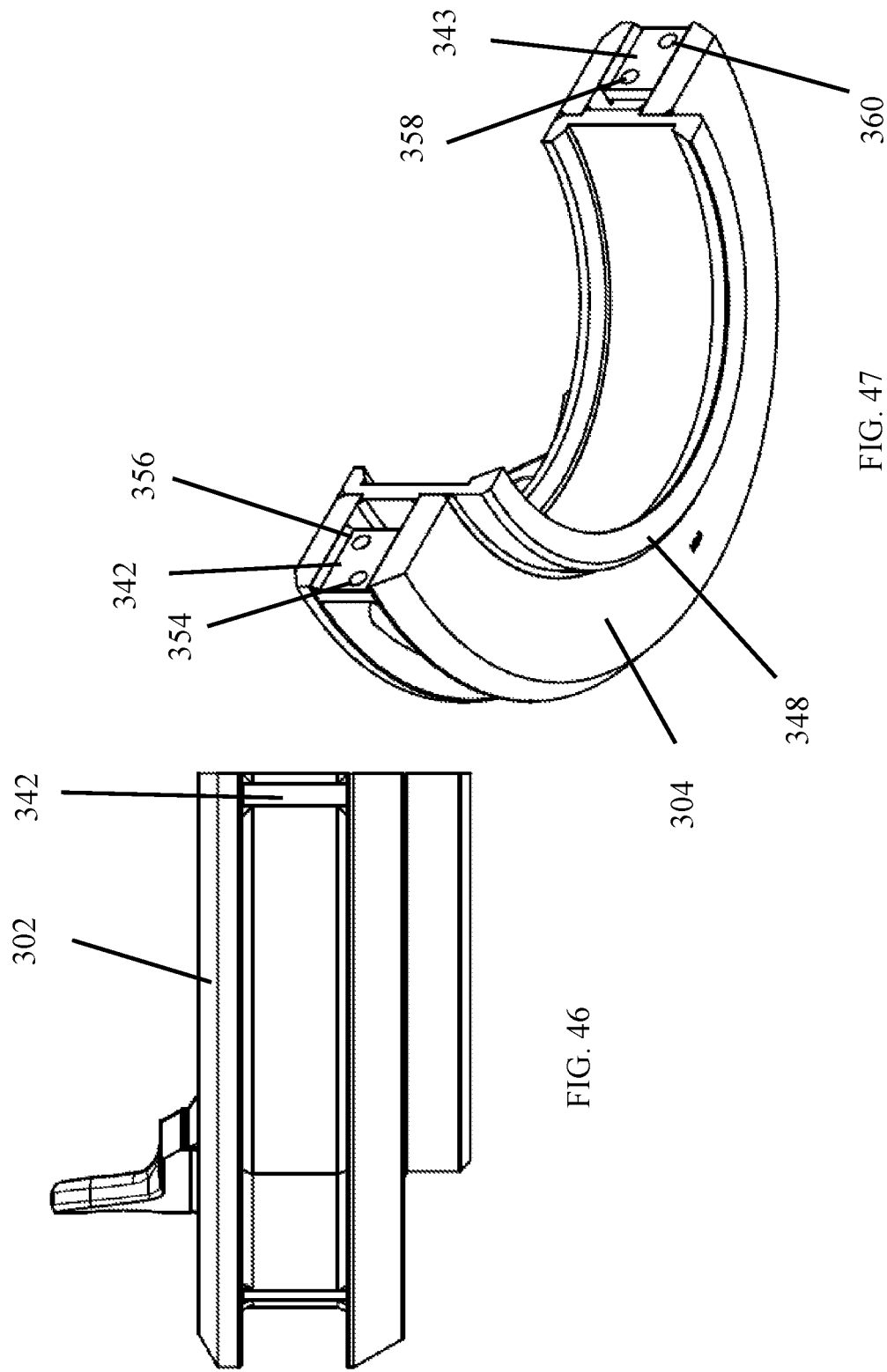
FIG. 46 is a left side view of an attachment body of one embodiment of the present invention, the right side view being a mirror image of the left side view.
FIG. 47 is a bottom perspective view thereof.

FIG. 46 shows attachment body 302 and support 342. Support 342 provides apertures for insertion of the fasteners.

FIG. 47 shows supports 342, 343 and apertures 354, 356, 358, 360. Four fasteners insert into the apertures 354, 356, 358, 360 for securing the attachment bodies to each other.

Figure 48:
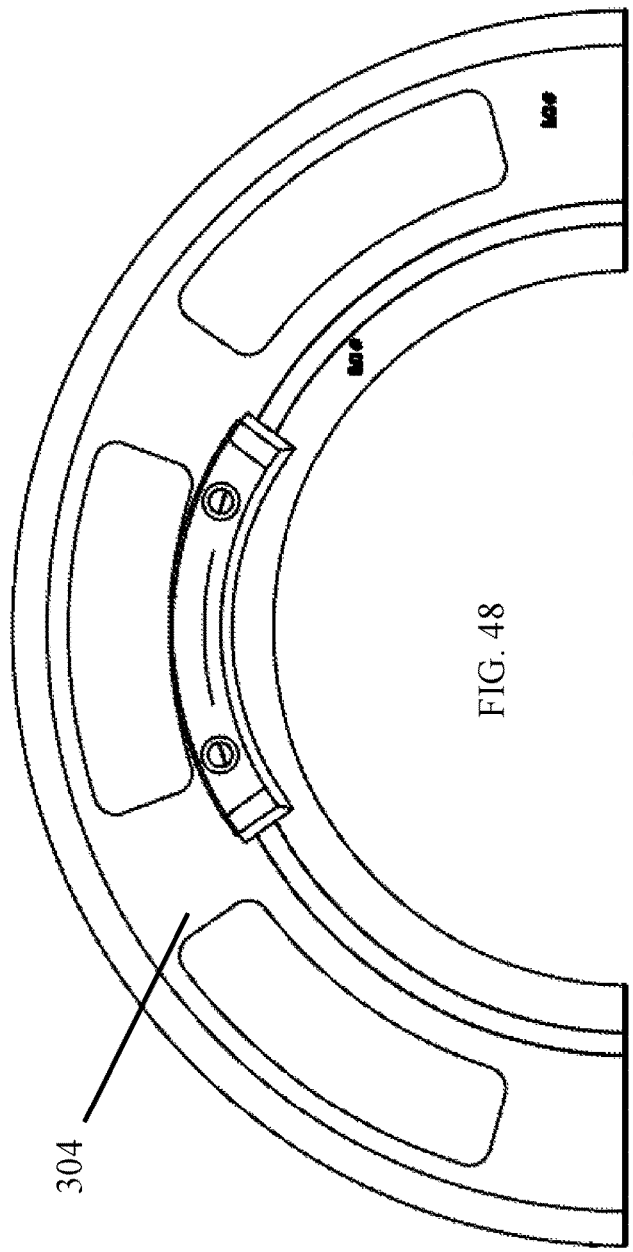
FIG. 48 is a top view thereof.

FIG. 48 shows the attachment body 304 and the apertures.

Figure 49:
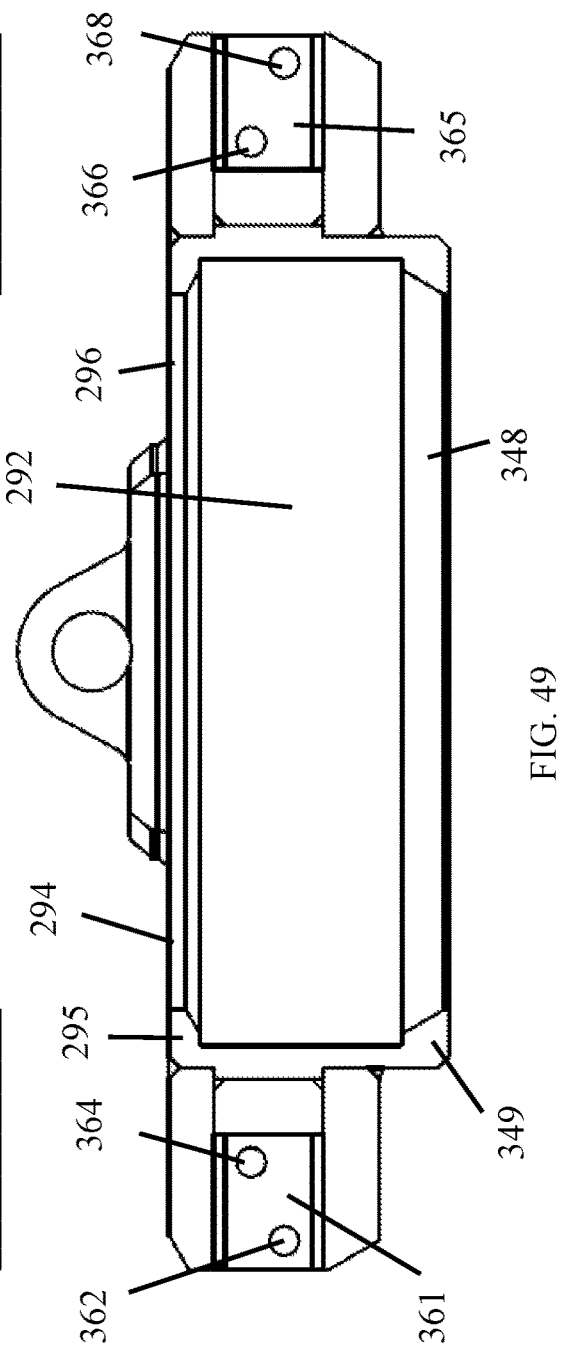
FIG. 49 is a front view thereof.

FIG. 49 shows apertures 362, 364, 366, 368 of the supports of attachment body 302. As discussed above, four fasteners insert into the apertures 362, 364, 366, 368 for securing the attachment bodies to each other.

Continuing to refer to FIG. 49, interior wall 296 forms the radially outermost surface defining the central aperture 292 in adapter assembly 300 for accepting the inner structure, such as the outer barrel. In one embodiment, the diameter of the interior wall 296 decreases from the central portion towards the vertical edges of the adapter assembly.

Retention fingers 295, 349 extend radially inwards from the interior surface 296 to decrease the diameter of the aperture 292 and the interior wall 296. The diameter of interior wall 296 decreases vertically upwards and vertically downwards at or near top 294 and leg 348 of the adapter assembly 300. The decreased diameter of one embodiment assists with securing the attachment body 300 to the inner structure.

Figure 50:
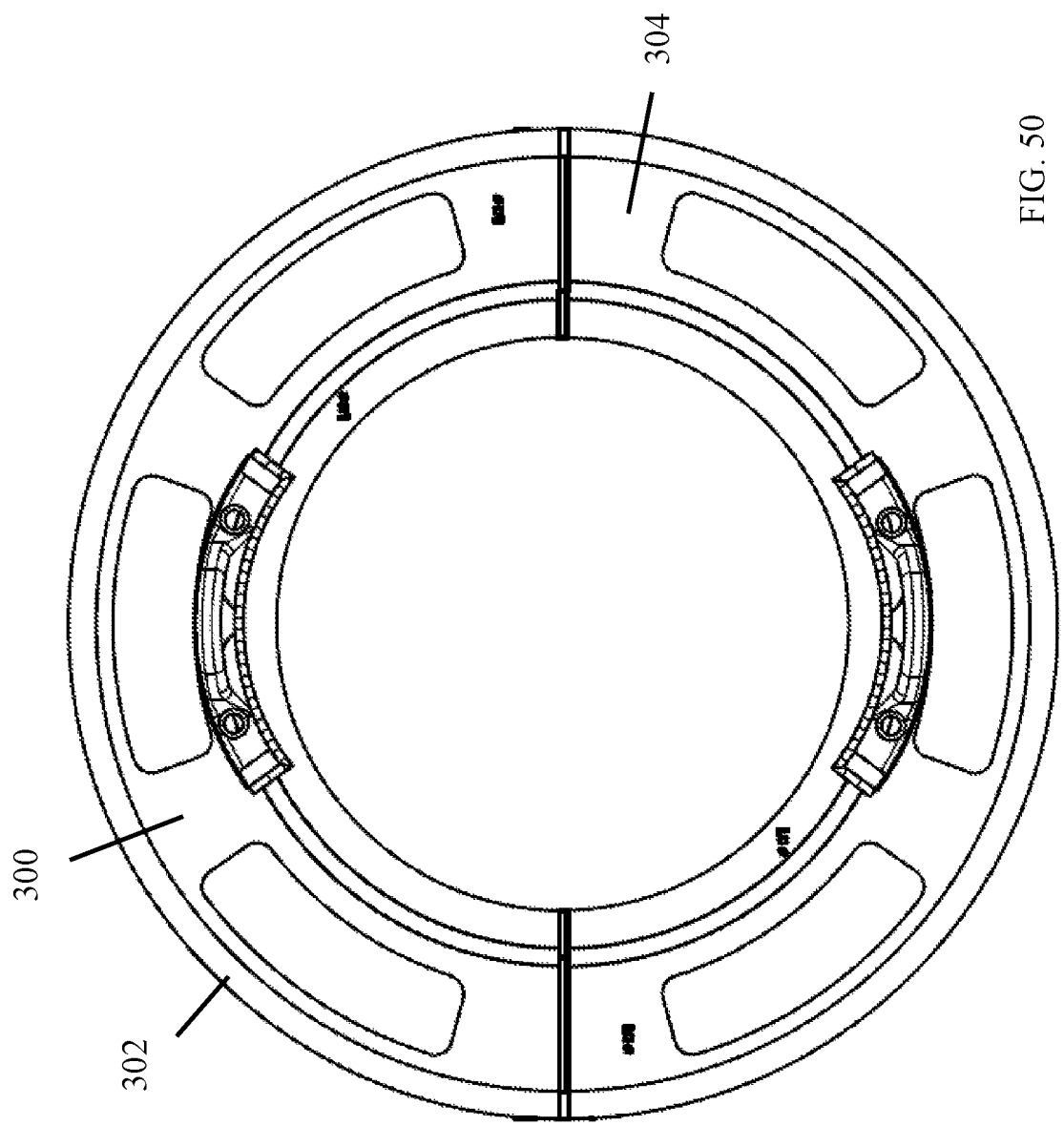
FIG. 50 is a top view of an adapter assembly of one embodiment of the present invention.

FIG. 50 shows the attachment bodies 302, 304 to each other via the fasteners. The attachment bodies 302, 304 secure to each other to form adapter assembly 300.

Figure 51:
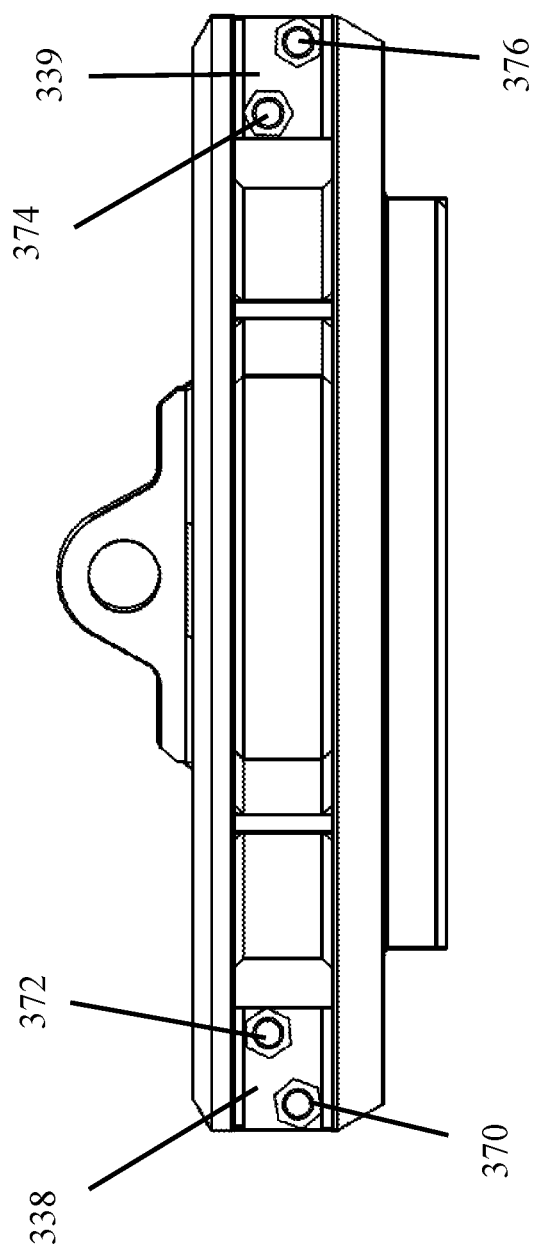
FIG. 51 is a rear view thereof.

FIG. 51 shows the nuts 370, 372, 374, 376 that accept the fasteners. The fasteners insert into the nuts 370, 372, 374, 376 to secure the attachment bodies 302, 304 to each other. Nuts 370, 372 secure to support 338. Nuts 374, 376 secure to support 339. The nuts of one embodiment are secured to the supports by welding the nuts to the supports.

Figure 52:
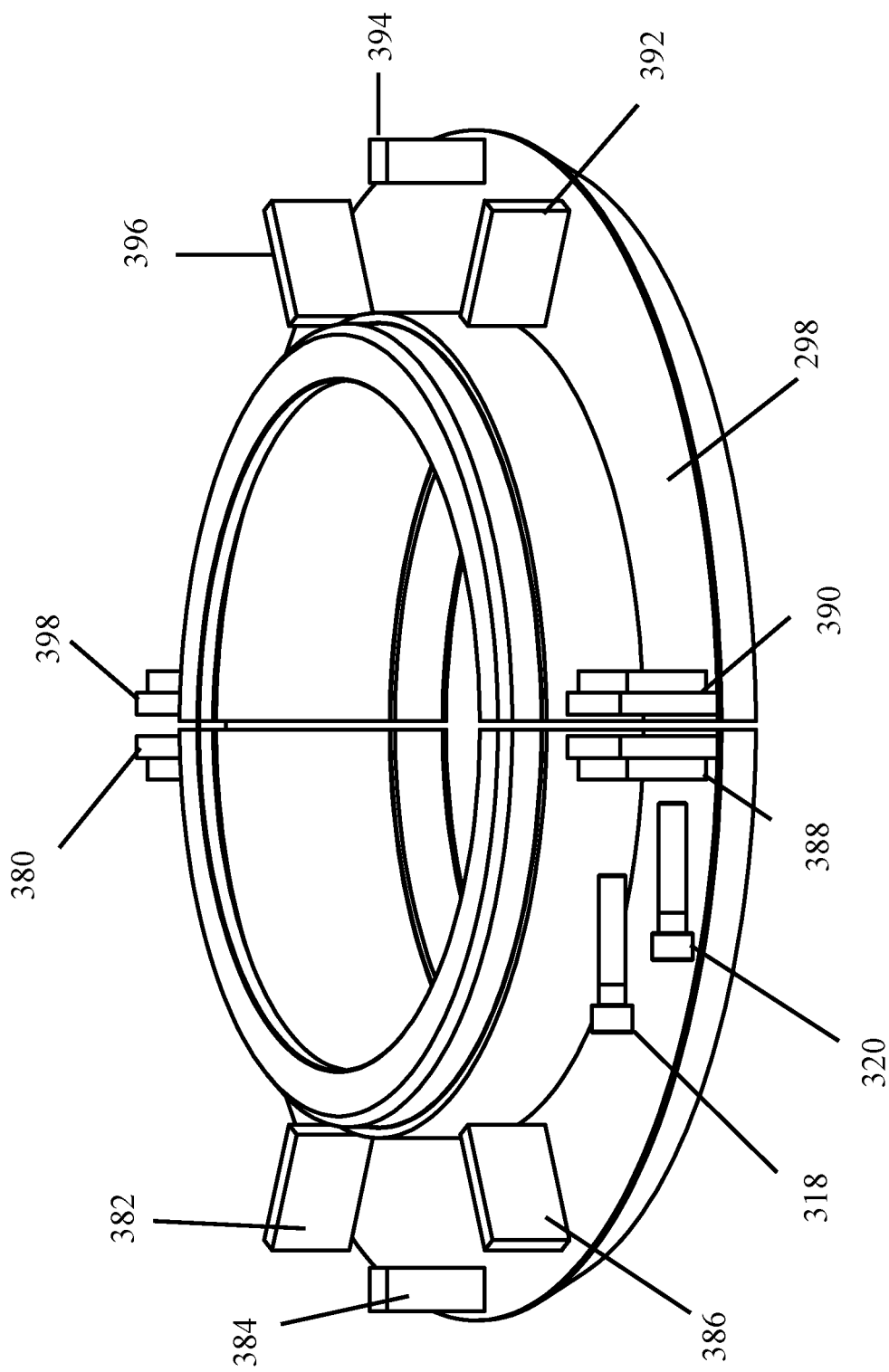
FIG. 52 is a partial view of an adapter assembly of one embodiment of the present invention.

FIG. 52 shows a partial view of the adapter assembly. The top of the adapter assembly has been removed to show the floor 298 and the supports 380, 382, 384, 386, 388, 390, 394, 396, 398 extending vertically upward from the floor 298 to the top. Supports 382, 384, 386, 392, 394, 396 extend upwards to support the top while reducing the weight of the adapter assembly.

Edge supports 380, 388, 390, 398 provide vertical support at the edges of each attachment body. Apertures through edge supports 380, 388, 390, 398 accept fasteners 318, 320 to secure the attachment bodies to each other. Fasteners 318, 320 insert into edge support 308. Edge support 390 of one embodiment provides a nut block at the aperture for securing the nut to the support 390. The nut secures the fasteners 318, 320 to attach the attachment bodies to each other.

The adapter assembly 300 increases the surface exterior of an inner structure, including but not limited to an outer barrel or a nipple base, for attachment of the inner structure to a housing such as a bowl. Inner structures, such as outer barrels and nipple bases, are available in multiple sizes such as a 16 inch, 20 inch, 20 inch oversized, 30 inch, other custom sizes, and sizes larger than 30 inches for placement within the housing, such as the bowl. Each sized inner structure fits a specified bowl for attachment of the inner structure, such as the outer barrel, to the housing, such as the bowl.

The adapter assembly increases the surface exterior of the inner structure to one of the sizes required for attachment to the bowl. The adapter assembly secures to the inner structure. The adapter assembly extends radially outward from the inner structure to increase the size of the outermost radial surface. For example, the adapter assembly may extend outward from the 16 inch outer barrel to install the outer barrel within the 20 inch bowl, 20 inch oversized bowl, or the 30 inch bowl, depending on the size of the bowl. Likewise, the adapter assembly may extend outward from the 20 inch outer barrel to install the outer barrel within the 20 inch oversized bowl or the 30 inch bowl, depending on the size of the bowl. In addition, the adapter assembly may extend outward from the 20 inch oversized outer barrel to install the outer barrel within the 30 inch bowl. The adapter assembly may also extend outwards from the outer barrel to install the outer barrel within a custom sized bowl, including but not limited to a bowl larger than 30 inches. Therefore, the adapter assembly increases the exterior of the outer barrel for attachment of the outer barrel to the bowl designed for any of the 20 inch, 20 inch oversized, the 30 inch bowls, custom sized bowls, or larger bowls.

Similarly, the adapter assembly may extend outwards from the nipple base. Another embodiment of the adapter assembly secures around a base, such as a drilling nipple base. The adapter assembly enables different sized bases to be installed within the appropriate bowl similar to the adapter assembly described above.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An adapter assembly attaching with an inner structure, the adapter assembly extending radially outward from the inner structure for contacting a clamp that secures the adapter assembly and the inner structure within a housing, the adapter assembly comprising:
   a first attachment body forming an open curve configured to conform with the inner structure, wherein a radially outermost surface of the first attachment body forms a curved surface;
   a second attachment body forming an open curve configured to conform with the inner structure, wherein a radially outermost surface of the second attachment body forms a curved surface;
   the first attachment body attachable with the second attachment body to define a central aperture extending along a longitudinal axis between the open curve of the first attachment body and the open curve of the second attachment body, wherein an exterior portion of the inner structure is secured within the central aperture;
   a top of the first attachment body;
   a floor of the first attachment body located vertically below the top;
   a hollow spacing located axially between the top and the floor of the first attachment body;
   an interior wall formed by securing the first attachment body with the second attachment body, the interior wall defining a diameter of the central aperture;
   a first retention finger extending radially inward from the interior wall, the first retention finger decreasing the diameter of the central aperture at the first retention finger; and
   a second retention finger extending radially inward from the interior wall, the second retention finger decreasing the diameter of the central aperture at the second retention finger, the second retention finger located vertically below the first retention finger; and
   wherein the second retention finger is located vertically below the floor;
   wherein an exterior surface at the second retention finger is located radially inward from the exterior surface at the floor.

2. The adapter assembly of claim 1 further comprising:
   a support extending axially between the top and the floor of the first attachment body.

3. The adapter assembly of claim 1 further comprising:
   an aperture in the top of the first attachment body.

4. The adapter assembly of claim 1 further comprising:
   a first end of the open curve of the first attachment body;
   an end support extending axially between the top and the floor of the first attachment body, the end support located adjacent the first end.

5. The adapter assembly of claim 4 further comprising:
   an aperture in the end support, the aperture in the end support accepting a fastener to secure the first attachment body to the second attachment body.

6. The adapter assembly of claim 4 further comprising:
   a first end of the open curve of the second attachment body;
   an end support of the second attachment body extending axially between the top and the floor of the second attachment body, the end support of the second attachment body located adjacent the first end of the second attachment body.

7. The adapter assembly of claim 6 further comprising:
   an aperture in the end support of the first attachment body, the aperture in the end support of the first attachment body accepting a fastener to secure the first attachment body to the second attachment body;
   an aperture in the end support of the second attachment body, the aperture in the end support of the second attachment body accepting the fastener to secure the first attachment body to the second attachment body;
   the aperture in the end support of the first attachment body aligning with the aperture in the end support of the second attachment body to accept the fastener to secure the first attachment body with the second attachment body.

8. The adapter assembly of claim 7 further comprising:
   a nut secured to the end support of the second attachment body at the aperture wherein the nut accepts a fastener to secure the first attachment body with the second attachment body.

9. The adapter assembly of claim 1 further comprising:
   a leg extending axially downward from the floor;
   an outer surface of the floor, wherein the outer surface of the floor extends radially outward from the central aperture for a floor radial distance; and
   an outer surface of the leg extending axially downward below the floor, wherein the outer surface of the leg extends radially outward from the central aperture;

wherein the outer surface of the leg is located radially inward from the outer surface of the floor.

10. An adapter assembly attaching with an inner structure, the adapter assembly extending radially outward from the inner structure for contacting a clamp that secures the adapter assembly and the inner structure within a housing, the adapter assembly comprising:
a first attachment body forming an open curve;
a second attachment body forming an open curve;
the first attachment body attachable with the second attachment body to define a central aperture extending along a longitudinal axis between the open curve of the first attachment body and the open curve of the second attachment body;
a top of the first attachment body;
an outer surface of the top, wherein the outer surface of the top extends radially outward from the central aperture for a top radial distance;
a floor of the first attachment body;
an outer surface of the floor, wherein the outer surface of the floor extends radially outward from the central aperture for a floor radial distance;
a hollow spacing located axially between the top and the floor of the first attachment body;
an interior wall formed by securing the first attachment body with the second attachment body, the interior wall defining a diameter of the central aperture;
a first retention finger extending radially inward from the interior wall, the first retention finger decreasing a diameter of the central aperture at the first retention finger;
a second retention finger extending radially inward from the interior wall, the second retention finger decreasing the diameter of the central aperture at the second retention finger, the second retention finger located vertically below the first retention finger; and
an outer surface of the second retention finger, wherein the outer surface of the second retention finger extends radially outward from the central aperture less than the floor radial distance.

11. The adapter assembly of claim 10 further comprising:
a support extending axially between the top and the floor of the first attachment body.

12. The adapter assembly of claim 11 further comprising:
a first end of the open curve of the first attachment body;
an end support extending axially between the top and the floor of the first attachment body, the end support located adjacent the first end.

13. The adapter assembly of claim 12 further comprising:
an aperture in the end support, the aperture in the end support accepting a fastener to secure the first attachment body to the second attachment body.

14. The adapter assembly of claim 13 further comprising:
a first end of the open curve of the second attachment body;
an end support of the second attachment body extending axially between the top and the floor of the second attachment body, the end support of the second attachment body located adjacent the first end of the second attachment body;
an aperture in the end support of the second attachment body, the aperture in the end support of the second attachment body accepting the fastener to secure the first attachment body to the second attachment body;
a nut secured to the end support at the aperture of the second attachment body, wherein the nut accepts the fastener to secure the first attachment body with the second attachment body.

15. An adapter assembly attaching with an inner structure, the adapter assembly extending radially outward from the inner structure for contacting a clamp that secures the adapter assembly and the inner structure within a housing, the adapter assembly comprising:
a first attachment body forming an open curve, wherein a radially outermost surface of the first attachment body forms a curved surface;
a second attachment body forming an open curve, wherein a radially outermost surface of the second attachment body forms a curved surface;
the first attachment body attachable with the second attachment body to define a central aperture extending along a longitudinal axis, wherein the radially outermost surface of the first attachment body secured to the radially outermost surface of the second attachment body forms a closed curve;
an interior wall formed by securing the first attachment body with the second attachment body, the interior wall defining the central aperture, the interior wall defining a diameter of the central aperture;
wherein the diameter of the central aperture decreases towards a top of the interior wall and a bottom of the interior wall, wherein the diameter of the central aperture increases at a location axially between the top and the bottom of the interior wall;
a top of the first attachment body;
a floor of the first attachment body;
a hollow spacing located axially between the top and the floor;
an outer surface of the top, wherein the outer surface of the top extends radially outward from the central aperture for a top radial distance;
an outer surface of the floor, wherein the outer surface of the floor extends radially outward from the central aperture for a floor radial distance;
a leg extending axially downward from the floor;
an outer surface of the leg extending downward below the floor, wherein the outer surface of the leg is located radially inward from the outer surface of the floor.

16. The adapter assembly of claim 15 further comprising:
a first end of the open curve of the first attachment body;
an end support extending axially between the top and the floor of the first attachment body, the end support located adjacent the first end;
an aperture in the end support of the first attachment body, the aperture in the end support accepting a fastener to secure the first attachment body to the second attachment body;
a first end of the open curve of the second attachment body;
an end support extending axially between the top and the floor of the second attachment body, the end support of the second attachment body located adjacent the first end of the second attachment body;
a nut secured to the end support of the second attachment body at the aperture wherein the nut accepts the fastener to secure the first attachment body with the second attachment body.

17. The system of claim 15 further comprising:
a first retention finger extending radially inward from the interior wall, the first retention finger decreasing the diameter of the central aperture;

a second retention finger extending radially inward from the interior wall, the second retention finger decreasing the diameter of the central aperture, the second retention finger located axially below the first retention finger;

wherein the second retention finger extends radially inward from the leg;

wherein the second retention finger is located axially below the floor.

18. The adapter assembly of claim 17 further comprising:
a support extending axially between the top and the floor of the first attachment body.

19. The adapter assembly of claim 15 further comprising:
a support extending axially between the top and the floor of the first attachment body.

* * * * *